(12) United States Patent
Ohira et al.

(10) Patent No.: US 7,991,189 B2
(45) Date of Patent: Aug. 2, 2011

(54) IMAGE PROCESSING APPARATUS, IMAGE FORMING APPARATUS, IMAGE PROCESSING SYSTEM, AND IMAGE PROCESSING METHOD

(75) Inventors: Masakazu Ohira, Shiki-gun (JP); Hideyoshi Yoshimura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 798 days.

(21) Appl. No.: 12/055,953

(22) Filed: Mar. 26, 2008

(65) Prior Publication Data

US 2008/0240492 A1    Oct. 2, 2008

(30) Foreign Application Priority Data

Mar. 28, 2007  (JP) ................................ 2007-085926
Mar. 7, 2008   (JP) ................................ 2008-058611

(51) Int. Cl.
*G06K 9/00* (2006.01)

(52) U.S. Cl. ........ 382/100; 382/209; 382/218; 382/219; 382/220

(58) Field of Classification Search .................. 382/100, 382/209, 218, 219, 220
See application file for complete search history.

(56) References Cited

U.S. PATENT DOCUMENTS

| | | | |
|---|---|---|---|
| 5,465,353 A | 11/1995 | Hull et al. | |
| 5,799,115 A | 8/1998 | Asano et al. | |
| 6,523,113 B1 * | 2/2003 | Wehrenberg | 713/176 |
| 2002/0012444 A1 * | 1/2002 | Nishikawa et al. | 382/100 |

FOREIGN PATENT DOCUMENTS

| | | |
|---|---|---|
| JP | 5-110815 A | 4/1993 |
| JP | 7-74945 A | 3/1995 |
| JP | 7-282088 A | 10/1995 |
| JP | 8-255236 A | 10/1996 |
| WO | WO-2006/092957 A1 | 9/2006 |

* cited by examiner

*Primary Examiner* — Wesley Tucker
*Assistant Examiner* — Mark Roz
(74) *Attorney, Agent, or Firm* — Birch, Stewart, Kolasch & Birch, LLP

(57) ABSTRACT

A storage process section stores, into an exceptional reference image list, discrimination information for discriminating a reference image which permits image processing and a reference image which forbids or restricts image processing. In case where a maximum value of a similarity calculated by a voting process section is not less than a threshold value, a control section determines whether a reference image having a maximum similarity is the reference image which permits image processing or a reference image which forbids or restricts image processing and determines whether or not it is necessary to forbid or restrict image processing with respect to input image data in accordance with a result of the determination. This makes it possible to prevent erroneous determination from forbidding execution of image processing based on input image data or to prevent erroneous determination from allowing execution of image processing based on input image data.

9 Claims, 21 Drawing Sheets

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

| HASH VALUE | INDEX INDICATIVE OF DOCUMENT |
|---|---|
| H1 | ID1 |
| H2 | ID1 |
| H3 | ID1, ID2 |
| H4 | ID1 |
| H5 | ID1 |
| H6 | ID1, ID2 |
| ⋮ | ⋮ |

FIG. 10 (b)

| HASH VALUE | INDEX INDICATIVE OF DOCUMENT |
|---|---|
| H1 | ID1, ID1 |
| H2 | ID1 |
| H3 | ID1, ID2 |
| H4 | ID1 |
| H6 | ID1, ID2 |
| ⋮ | ⋮ |

IMAGE PROCESSING APPARATUS, IMAGE FORMING APPARATUS, IMAGE PROCESSING SYSTEM, AND IMAGE PROCESSING METHOD

This Nonprovisional application claims priority under 35 U.S.C. §119(a) on Patent Application No. 085926/2007 filed in Japan on Mar. 28, 2007 and Patent Application No. 058611/2008 filed in Japan on Mar. 7, 2008, the entire contents of which are hereby incorporated by reference.

FIELD OF THE INVENTION

The present invention relates to an image processing apparatus, an image forming apparatus, an image processing system, and an image processing method, each of which allows similarity determination between input image data and pre-registered image data and allows a control according to the result of the similarity determination.

BACKGROUND OF THE INVENTION

There has been used a technique for comparing (i) input image data obtained by reading a document image with a scanner and (ii) a pre-registered image, so as to determine similarity between the input image data and the pre-registered image, and controlling a process (such as copy, transmission, and edition) to the input image data in accordance with the result of the determination.

Examples of a method for determining similarity include: a method in which a keyword is extracted from an image with OCR (Optical Character Reader) so as to carry out matching with the keyword; a method in which a target image is limited to an image with ruled lines and matching is carried out based on features of the ruled lines (see Patent Document 1 (Japanese Unexamined Patent Publication: Tokukaihei 8-255236 (published on Oct. 1, 1996))); and a method in which similarity is determined based on distribution of color components of input image data and a reference image (see Patent Document 2 (Japanese Unexamined Patent Publication: Tokukaihei 5-110815 (published on Apr. 30, 1993))). Furthermore, Patent Document 3 (Japanese Unexamined Patent Publication: Tokukaihei 7-282088 (published on Oct. 27, 1995) discloses a technique in which a descriptor that is invariable to distortion caused by digitalization of an input document or to a difference between the input document and a document database is generated based on feature points of the input document, and matching between the input document and a document in the document database is performed using the descriptor and a descriptor database which stores descriptors and which indicates a list of documents including features from which descriptors are extracted. In the technique, when the descriptor database is scanned, votes for individual documents in the document database are accumulated, and a document with the largest number of votes or a document whose number of votes is over a certain threshold value is considered as a matching document.

Furthermore, Patent Document 4 (International Publication No. 2006/092957, pamphlet (published on Sep. 8, 2006) discloses a technique in which plural feature points are extracted from a digital image, a set of local feature points are determined out of the extracted feature points, a partial set of feature points is selected out of the determined set of local feature points, invariants relative to geometric transformation each as a quantity characterizing the selected partial set is calculated in accordance with plural combinations of feature points in the partial set, features are calculated by combining the calculated invariants, and a document or an image with the calculated features in a database is voted for, thereby searching a document or an image corresponding to the digital image.

Furthermore, an example of a technique for controlling a process for input image data in accordance with the result of similarity determination is as follows: in order to prevent forgery of a bill or securities by a color image forming apparatus, it is determined whether input image data is identical with image data such as a bill or securities (reference image) or not based on a pattern extracted from the input image data, and when the input image data is identical with the image data of the reference image, a specific pattern is given to an output image so as to specify the image forming apparatus that carries out copying, a copied image is daubed, or copying is prevented.

Incidentally, the image processing apparatus which determines whether the input image data is identical to image data of the reference image or not may give erroneous determination caused by conditions at the time of reading a document due to limitation such as document image reading accuracy and the like.

Thus, according to the aforementioned conventional techniques, in case where the input image data is determined as being identical to image data of the reference image, there are performed processes, such as addition of a specific pattern, restriction of processing by daubing a copy image, and forbidding of a copying operation. Thus, image processing desired by the user cannot be carried out with respect to input image data which is actually not identical to image data of the reference image but has been erroneously determined as being identical to the image data of the reference image.

Further, inversely with the aforementioned technique, it may be so arranged that image processing (e.g., copying, printing, electronic distribution, facsimile transmission, filing, image data correction/edition, and the like) is permitted in case where the input image data is determined as being identical to image data of the reference image and image processing is forbidden or restricted in case where the input image data is determined as not being identical to image data of the reference image. However, according to this arrangement, in case where the input image data is erroneously determined as being identical to image data of the reference image, image processing which actually should be forbidden or restricted is permitted. This may result in security problems such as leakage of secret information and a similar problem.

SUMMARY OF THE INVENTION

The present invention was made in view of the foregoing problems, and an object of the present invention is to provide an image processing apparatus which determines similarity (whether there is a similarity or no similarity) between input image data and a reference image and determines whether or not it is necessary to forbid or restrict image processing with respect to the input image data in accordance with the determination result, whereby it is possible to prevent such trouble that erroneous determination prevents execution of image processing based on input image data which image processing should be permitted or erroneous determination permits execution of image processing based on input image data which image processing should be forbidden or restricted.

In order to solve the foregoing problems, an image processing apparatus of the present invention comprises: an input data obtaining section for obtaining input image data; a features extracting section for extracting features of the input image data; at least one of a storage section for storing features of each of reference images and a reference image obtaining section for obtaining the features of the reference image from an external device communicably connected to the image processing apparatus; a similarity calculation section for comparing the features of the input image data with the features of the reference image so as to calculate a similarity between the input image data and the reference image; and a control section for determining whether it is necessary or not to forbid or restrict image processing with respect to the input image data in accordance with whether or not the similarity is not less than a predetermined threshold value, said image processing apparatus being characterized in that: the reference images include a permissible reference image which permits image processing and a restrictive reference image which forbids or restricts image processing, and the image processing apparatus further comprises a discrimination information obtaining section for obtaining, from the storage section or the external device, discrimination information for discriminating the permissible reference image and the restrictive reference image from each other, and when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image.

Note that, the image processing should not be narrowly interpreted as image transformation, conversion, encode, or the like, and means also various processing carried out with respect to image data, e.g., copying, printing, electronic distribution, facsimile transmission, filing, image data correction/edition/conversion/encode, and the like. Further, the input data obtaining section may be arranged so that, for example, a scanner reads a document so as to acquire input image data, or may be arranged so that input image data generated by inputting necessary information to an electronic data format by using software is obtained, or may be arranged so that input image data directly generated as electronic data is obtained, or may be arranged so that input image data sent from a device communicably connected to the image processing apparatus is obtained.

According to the arrangement, the features extracting section extracts features of the input image data obtained by the input data obtaining section. Further, the similarity calculation section compares the features of the input image data which features have been extracted by the features extracting section with features of a reference image which features are stored in the storage section or features of a reference image which features have been obtained from the external device by the reference image obtaining section so as to calculate a similarity between both the images. Note that, the reference images include a permissible reference image which permits image processing and a restrictive reference image which forbids or restricts image processing. Further, the discrimination information obtaining section obtains, from the storage section or the external device, discrimination information for discriminating the permissible reference image and the restrictive reference image from each other, and when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image.

Both the permissible reference image and the restrictive reference image are stored. Thus, in case where the maximum value of the similarity calculated by the similarity determination process section is not less than the threshold value, whether or not it is necessary to forbid or restrict image processing can be determined in accordance with whether a reference image having a maximum similarity is the permissible reference image or the restrictive reference image. Therefore, for example, even if input image data is erroneously determined as being identical to a restrictive reference image, the input image data can be stored as a permissible reference image, thereby preventing the image input data from being erroneously determined thereafter. Adversely, even if input image data is erroneously determined as being identical to a permissible reference image, the input image data can be stored as a restrictive reference image, thereby preventing the image input data from being erroneously determined thereafter.

An image processing apparatus of the present invention may be arranged so as to comprise: an input data obtaining section for obtaining input image data; a features extracting section for extracting features of the input image data; at least one of a storage section for storing features of a restrictive reference image which forbids or restricts image processing and a reference image obtaining section for obtaining the features of the restrictive reference image from an external device communicably connected to the image processing apparatus; a similarity calculation section for comparing the features of the input image data with the features of the restrictive reference image so as to calculate a similarity between the input image data and the restrictive reference image; and a control section for forbidding or restricting image processing with respect to the input image data in case where the similarity is not less than a predetermined threshold value, said image processing apparatus being characterized by further comprising a storage process section for storing, into the storage section or a second storage section provided on the external device, (i) features of a permissible reference image which permits image processing and (ii) discrimination information for discriminating the restrictive reference image and the permissible reference image from each other, wherein the similarity calculation section calculates the similarity between the input image data and the restrictive reference image and a similarity between the input image data and the permissible reference image, and the control section permits image processing with respect to the input image data in case where the similarity to the restrictive reference image is not less than the threshold value and the similarity to the permissible reference image is higher than the similarity to the restrictive reference image.

According to the arrangement, the features extracting section extracts features of the input image data obtained by the input data obtaining section. Further, the similarity calculation section compares the features of the input image data which features have been extracted by the features extracting section with features of a restrictive reference image which features are stored in the storage section or features of a restrictive reference image which features have been obtained from the external device by the reference image obtaining section so as to calculate a similarity between both the images. The control section forbids or restricts image processing with respect to the input image data in case where the similarity is not less than the threshold value. However, the image processing apparatus includes the storage process section for storing, into the storage section or the second storage section provided on the external device, (i) features of a permissible reference image which permits image processing and (ii) discrimination information for discriminating the restrictive reference image and the permissible reference image from each other, and the similarity calculation section calculates the similarity between the input image data and the restrictive reference image and a similarity between the input image data and the permissible reference image. Further, the control section permits image processing with respect to the input image data in case where the similarity to the restrictive reference image is not less than the threshold value and the similarity to the permissible reference image is higher than the similarity to the restrictive reference image.

Thus, even if input image data has a similarity to a restrictive reference image which similarity is not less than the threshold value though the input image data is actually not image data of the restrictive reference image, the input image data can be stored as a permissible reference image, thereby carrying out image processing with respect to the input image data. For example, even if input image data is erroneously determined as being identical to a restrictive reference image, the input image data can be stored as a permissible reference image, thereby preventing the image input data from being erroneously determined thereafter. As a result, it is possible to prevent image processing with respect to the input image data from being inappropriately forbidden or restricted.

Further, an image processing apparatus of the present invention may be arranged so as to comprise: an input data obtaining section for obtaining input image data; a features extracting section for extracting features of the input image data; at least one of a storage section for storing features of a permissible reference image which permits image processing and a reference image obtaining section for obtaining the features of the permissible reference image from an external device communicably connected to the image processing apparatus; a similarity calculation section for comparing the features of the input image data with the features of the permissible reference image so as to calculate a similarity between the input image data and the permissible reference image; and a control section for permitting image processing with respect to the input image data in case where the similarity is not less than a predetermined threshold value, said image processing apparatus being characterized by further comprising a storage process section for storing, into the storage section or a second storage section provided on the external device, (i) features of a restrictive reference image which forbids or restricts image processing and (ii) discrimination information for discriminating the permissible reference image and the restrictive reference image from each other, wherein the similarity calculation section calculates the similarity between the input image data and the permissible reference image and a similarity between the input image data and the restrictive reference image, and the control section forbids or restricts image processing with respect to the input image data in case where the similarity to the permissible reference image is not less than the threshold value and the similarity to the restrictive reference image is higher than the similarity to the permissible reference image.

According to the arrangement, the features extracting section extracts features of the input image data obtained by the input data obtaining section. Further, the similarity calculation section compares the features of the input image data which features have been extracted by the features extracting section with features of a permissible reference image which features are stored in the storage section or features of a permissible reference image which features have been obtained from the external device by the reference image obtaining section so as to calculate a similarity between both the images. The control section forbids or restricts image processing with respect to the input image data in case where the similarity is not less than the threshold value. However, the image processing apparatus includes the storage process section for storing, into the storage section or the second storage section provided on the external device, (i) features of a restrictive reference image which permits image processing and (ii) discrimination information for discriminating the restrictive reference image and the permissible reference image from each other, and the similarity calculation section calculates the similarity between the input image data and the permissible reference image and a similarity between the input image data and the restrictive reference image. Further, the control section forbids or restricts image processing with respect to the input image data in case where the similarity to the permissible reference image is not less than the threshold value and the similarity to the restrictive reference image is higher than the similarity to the permissible reference image.

Thus, even if input image data has a similarity to a permissible reference image which similarity is not less than the threshold value though the input image data is actually not image data of the permissible reference image, the input image data can be stored as a restrictive reference image, thereby forbidding or restricting image processing with respect to the input image data. For example, even if input image data is erroneously determined as being identical to a permissible reference image, the input image data can be stored as a restrictive reference image, thereby preventing the image input data from being erroneously determined thereafter. As a result, it is possible to prevent image processing with respect to the input image data from being inappropriately permitted. This improves the security for the exceptional reference image. For example, it is possible to surely prevent image processing, such as copying, printing, transmission, conversion/edition, from being inappropriately carried out with respect to the exceptional reference image.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 10(a) and 10(b) are explanatory drawings each illustrating an example of an index indicative of a hash value regarding a feature point that is stored in a hash table and input image data.

DESCRIPTION OF THE EMBODIMENTS

Embodiment 1

An embodiment of the present invention is explained below. Explained in this embodiment is a case where an image processing apparatus of the present invention is applied to a digital color multi-functional printer (MFP).

(1-1. Arrangement of Digital Color Multi-Functional Printer 1)

Figure 2:
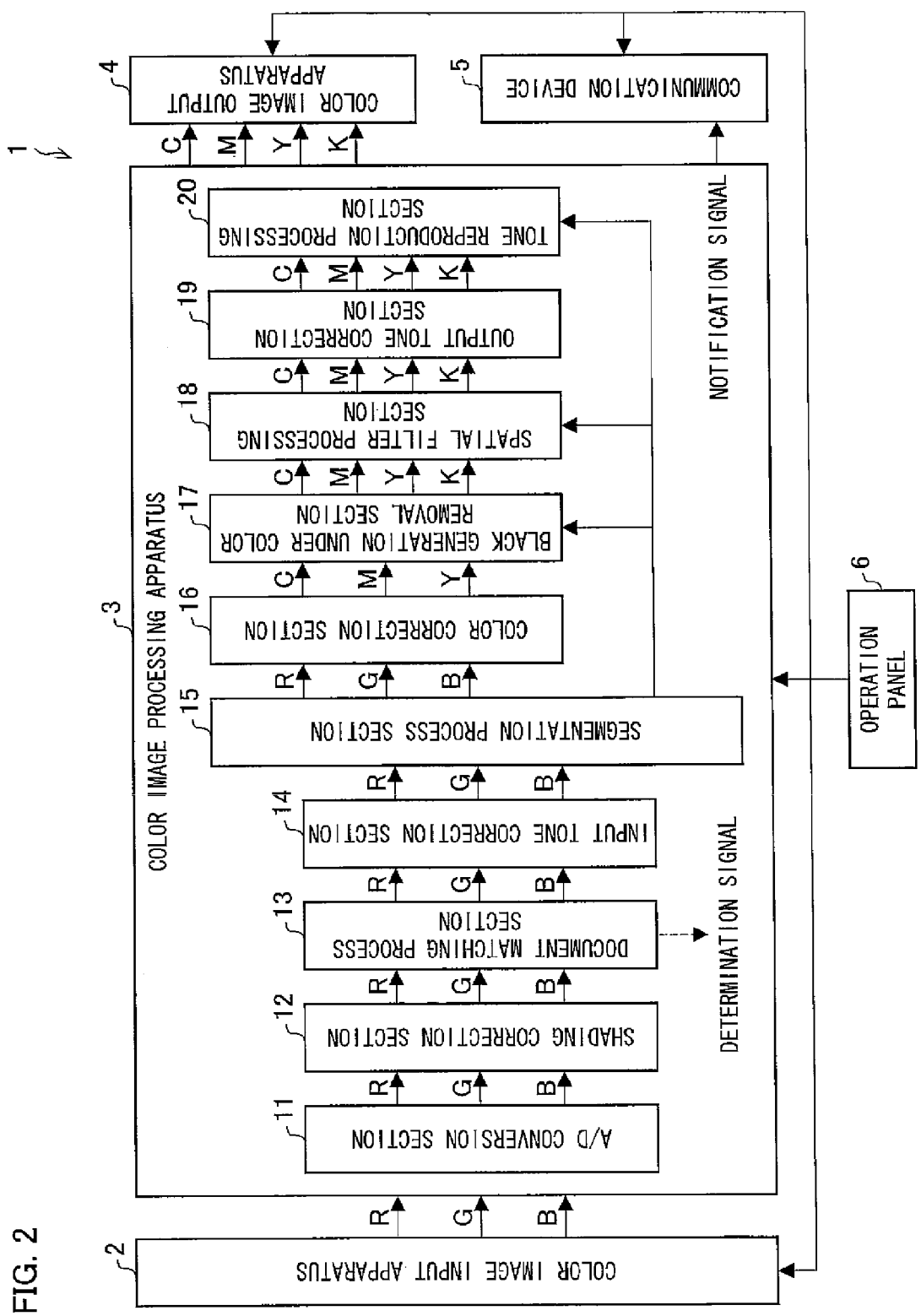
FIG. 2 is a block diagram schematically illustrating a structure of an image processing apparatus in accordance with an embodiment of the present invention.

FIG. 2 is a block diagram schematically illustrating an arrangement of a digital color multi-functional printer (image processing apparatus, image forming apparatus, image reading apparatus) 1 according to the present embodiment. The digital color multi-functional printer 1 has a copying function, a printing function, a facsimile transmission function, a scanning function, a scan-to-E-mail function, and the like.

As illustrated in FIG. 2, the digital color multi-functional printer 1 includes a color image input apparatus 2, a color image processing apparatus 3, a color image output apparatus 4, a communication device 5, and an operation panel 6.

The color image input apparatus (image scanning section) 2 is, for example, composed of a scanner (not shown) including a CCD (Charge Coupled Device) for converting optical information into an electric signal. In the color image input apparatus 2, the CCD reads an optical image reflected from an original document as RGB (R:Red, G:Green, B:Blue) analog signals and supplies the RGB analog signals to the color image processing apparatus 3.

The color image processing apparatus 3 includes an A/D conversion section 11, a shading correction section 12, a document matching process section 13, an input tone correction section 14, a segmentation process section 15, a color correction section 16, a black generation under color removal section 17, a spatial filter process section 18, an output tone correction section 19, and a tone reproduction process section 20. The analog signals read by the color image input apparatus 2 are transmitted to the A/D conversion section 11, the shading correction section 12, the document matching process section 13, the input tone correction section 14, the segmentation process section 15, the color correction section 16, the black generation under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in illumination system, image focusing system, and image sensing system of the color image input apparatus 2 from the RGB digital signals transmitted from the A/D conversion section 11. Moreover, the shading correction section 12 adjusts color balance of the RGB digital signals and converts each signal into a density (pixel value) signal which can be processed easily by an image processing system used in the color image processing apparatus 3.

The document matching process section 13 gives determination on similarity between input image data and a reference image (determines whether there is any similarity or not). Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals, whose various distortions have been removed by the shading correction section, and adjusts image quality such as contrast.

The segmentation process section 15 segments each pixel of an input image into either one of a text region, a halftone dot region, or a photograph (continuous tone) region, according to the RGB signals. On the basis of a result of the segmentation, the segmentation process section 15 outputs a segmentation class signal, indicating which region a pixel of the input image belongs to, to the color correction section 16, the black generation under color removal section 17, the spatial filter process section 18, and the tone reproduction process section 20. The segmentation process section 15 also outputs the input signal as received from the input tone correction section 14 to the subsequent color correction section 16.

The color correction section 16 removes color impurity on the basis of spectral characteristics of CMY (C:Cyan, M:Magenta, and Y:Yellow) color materials including an unnecessarily absorption component, in order to realize a faithful color reproduction.

The black generation under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter process on the basis of a segmentation class signal, with respect to the image data which is received in the form of the CMYK signals from the black generation under color removal section 17. In the spatial filter process, the spatial filter process section 18 corrects a spatial frequency characteristic, so as to prevent a blur or granularity deterioration in an output image. The tone reproduction process section 20, as with the spatial filter process section 18, performs predetermined processing with respect to the image data in the form of the CMYK signals, on the basis of the segmentation class signal.

For example, in the region segmented into a text region by the segmentation process section 15, the spatial filter process section 18 strongly emphasizes a high frequency component in edge enhancement process of the spatial filter process, in order to improve reproducibility of black texts (achromatic texts) or color texts (chromatic texts) especially. Concurrently, the tone reproduction process section 20 selects either binary processing or multi-level dithering processing on a high-resolution screen suitable for reproducing the high frequency component.

In the region segmented into a halftone dot region by the segmentation process section 15, the spatial filter process section 18 performs a low pass filter process for removing an input halftone dot component. The output tone correction section 19 performs the output tone correction process in which a signal such as the density signal is converted into a halftone dot area rate that is characteristics of a color image output apparatus 4. Subsequently, the tone reproduction process section 20 performs the tone reproduction process (tone generation) so that, ultimately, an image is segmented into pixels and each tone of the pixels can be reproduced. In the region segmented into a photograph region by the segmentation process section 15, the binary process or the multi-level dithering process is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data onto a recording medium such as paper. An example of the color image output apparatus 4 is a color image output apparatus which uses an electrophotographic method or an ink-jet method. However, the image output apparatus 4 is not specifically limited to this.

The communication device 5 is composed of a modem or a network card for example. The communication device 5 communicates with other device connected to a network (e.g., a personal computer, a server, other digital multi-functional printer, a facsimile device, and the like) via a network card, a LAN cable, and the like.

Note that, in case of transmitting image data, the communication device 5 reads out, from a memory, the image data compressed (encoded) in a predetermined format (image data scanned by a scanner) and carries out necessary process such as change of the compression format so as to sequentially transmit the image data via a communication line.

Further, in case of receiving image data, the communication device 5 carries out a communication procedure and receives the transmitted image data so as to input the image data to the color image processing apparatus 3. The received image data is subjected to predetermined processing such as decoding process, rotation processing, resolution conversion process, output tone correction, and ton reproduction processing by the color image processing apparatus 3, and the image data processed is outputted by the color image output apparatus 4. Note that, it may be so arranged that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons. The operation panel 6 causes the display section to display information corresponding to an instruction of a main control section (not shown) of the digital color multi-functional printer 1 and transmits information, inputted by the user with use of the setting buttons, to the main control section. The user can input, via the operation panel 6, a processing request (e.g., a processing mode (copying, printing, electronic distribution, facsimile transmission, filing, image data correction/edition, and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered via the operation panel 6, the main control section controls each operation of each section of the digital color multi-functional printer 1.

(1-2 Document Matching Process Section 13)

Next explained is an arrangement of the document matching process section 13. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value by combining the calculated invariants, and votes for a reference image corresponding to the hash value, thereby retrieving a reference image similar to the input image data and carrying out a similarity determination process (whether there is any similarity or not) with respect to the reference image.

Figure 1:
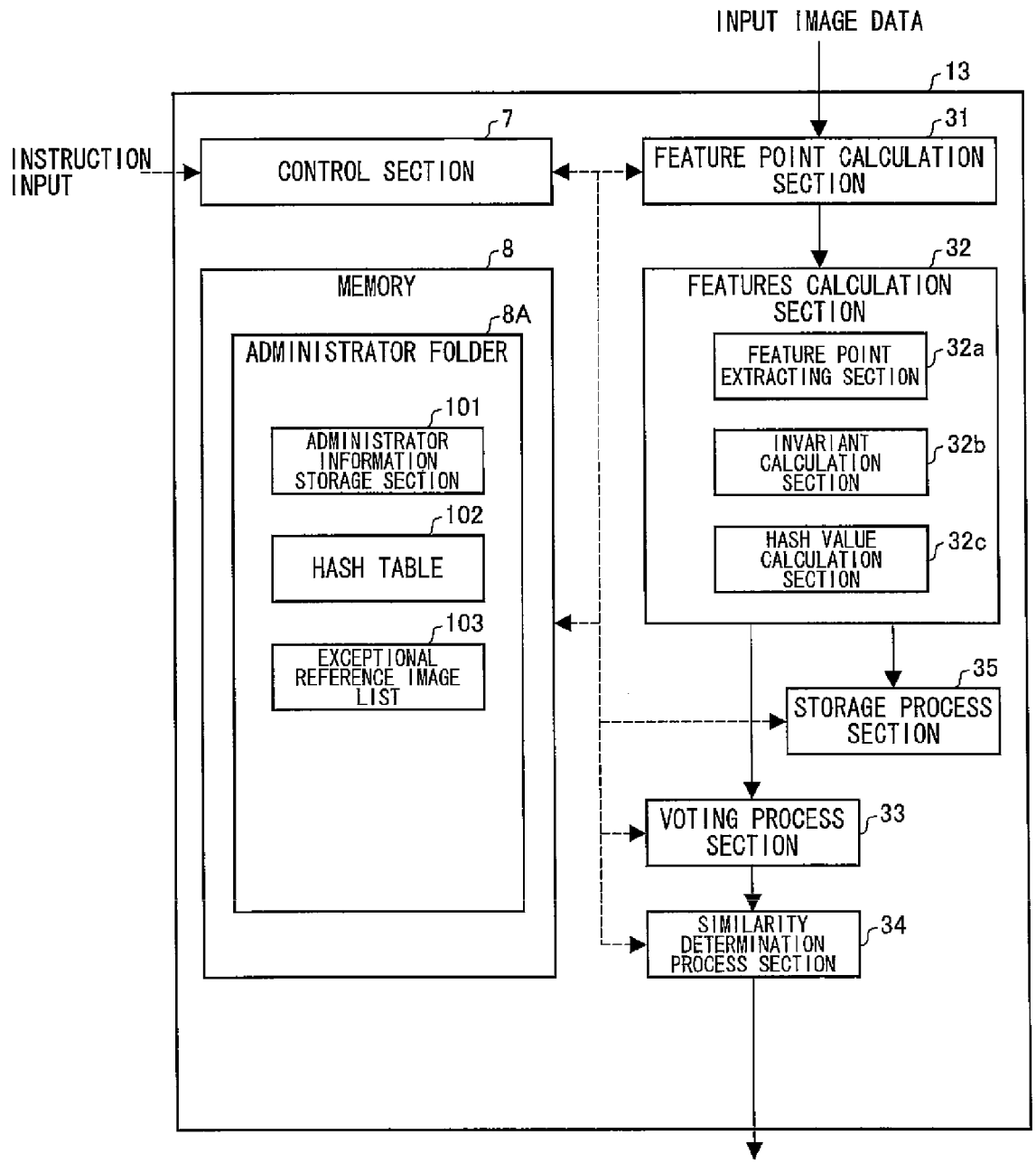
FIG. 1 is a block diagram schematically illustrating a structure of a document matching process section included in an image processing apparatus in accordance with an embodiment of the present invention.

FIG. 1 is a block diagram schematically illustrating an arrangement of the document matching process section 13. As illustrated in FIG. 1, the document matching process section 13 includes a feature point calculation section 31, a features (feature vectors) calculation section 32, a voting process section 33, a similarity determination process section 34, a storage process section 35, a control section 7, and a memory section 8.

The control section 7 controls operations of the sections of the document matching process section 13. Note that, the control section 7 may be provided in the main control section for controlling operations of the sections of the digital color multi-functional printer 1 or may be provided separately from the main control section so as to cooperate with the main control section in controlling operations of the document matching process section 13.

Further, in case where it is determined that there is no similarity as a result of the similarity determination of the document matching process section 13, the control section 7 permits image processing (copying, printing, electronic distribution, facsimile transmission, filing, image data correction/edition, and the like) to be carried out with respect to the input image data. Further, in case where it is determined that there is similarity (the input image data is identical to image data of the reference image), the control section 7 determines whether a most similar reference image is an exceptional reference image or not. Further, in case of the exceptional reference image, the control section 7 permits the image processing to be carried out with respect to the input image data. In case where the reference image is not the exceptional reference image, the control section 7 forbids or restricts execution of the image processing. Note that, the image processing is forbidden or restricted in case where the reference image is not the exceptional reference image. However, the arrangement is not limited to this. There may be given such restriction that a specific pattern is added to an image or the image is partially or entirely daubed for example.

The memory 8 stores various data, a processing result, and the like, which are used in the processing of each section of the document matching process section 13. Further, the memory 8 includes an administrator folder 8A, i.e., a folder (storage region) which can be seen and edited only by an administrator (specific user: person who is stored beforehand and is authorized to perform storage, edition, and a similar process, with respect to (i) features of the reference image and the exceptional reference image, (ii) a threshold value used in the similarity determination, (iii) and the like; e.g., a security administrator or a similar person).

The administrator folder 8A internally includes an administrator information storage section 101, a hash table 102, an exceptional reference image list 103.

The administrator information storage section 101 stores information for specifying an administrator permitted to see and edit the administrator folder 8A. In case where the administrator folder 8A is requested to be seen and edited, the control section 7 performs an authentication process with reference to the administrator information storage section 101 so as to determine whether or not to allow the operator to see and edit the administrator folder 8A. Note that, how to authenticate the administrator is not particularly limited, and various conventionally known authentication methods can be adopted. Further, in the present embodiment, the administrator sends information, required in authentication, to the digital color multi-functional printer 1 from an external device (computer, server, and the like) communicably connected to the digital color multi-functional printer 1, thereby carrying out the authentication. However, the authentication is not limited to this. For example, the authentication may be carried out via the operation panel 6 of the digital color multi-functional printer 1.

The hash table 102 is a table in which indexes (ID) of reference images and features of the reference images are stored with them corresponding to each other. The hash table 102 will be detailed later.

The exceptional reference image list 130 is a list of exceptional reference images each of which is permitted to be subjected to the image processing even in case where the input image is determined as being identical to image data of the reference image. That is, the control section 7 forbids or restricts execution of the image processing basically with respect to the input image data in case where the input image data is determined as being identical to image data of the reference image, but the control section 7 exceptionally permits execution of the image processing in case where the reference image is identical to the exceptional reference image.

The feature point calculation section 31 extracts a junction of a text sequence or a ruled line and performs calculation with a centroid of the junction used as a feature point. However, the arrangement of the feature point calculation section 31 is not limited to this, and the feature point may be calculated in accordance with various conventionally known methods for example.

Figures 3, 4:
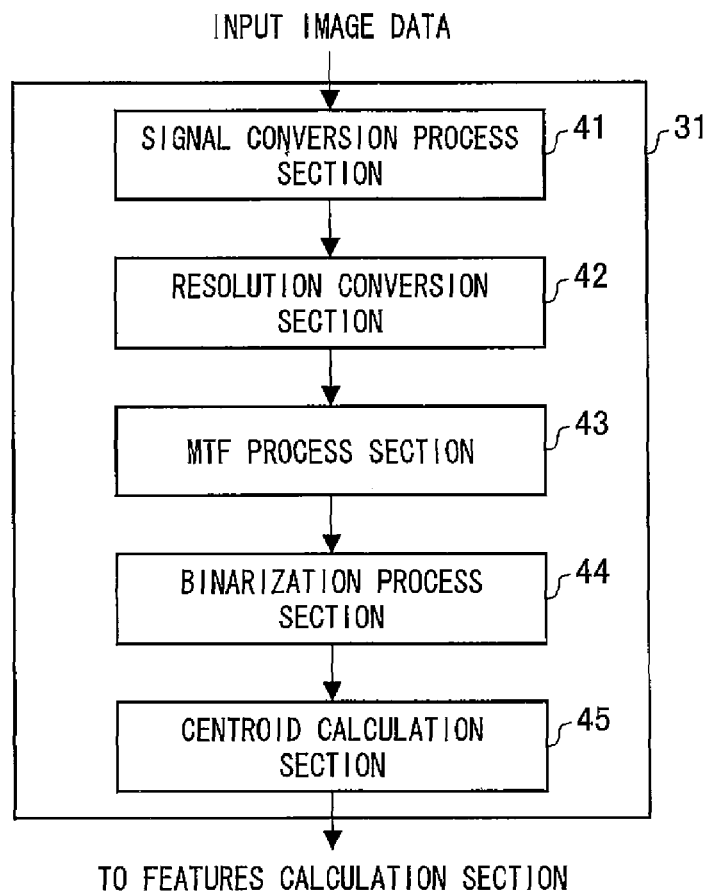
FIG. 3 is a block diagram schematically illustrating a structure of a feature point calculation section included in the image processing apparatus in FIG. 2.
FIG. 4 is an explanatory drawing illustrating an example of filter coefficients for a mixing filter included in an MTF process section of the image processing apparatus in FIG. 2.

FIG. 3 is a block diagram schematically illustrating an arrangement of the feature point calculation section 31. As illustrated in FIG. 3, the feature point calculation section 31 includes a signal process section 41, a resolution changing section 42, an MTF process section 43, a binarization process section 44, and a centroid calculation section 45.

In case where image data (RGB signals) inputted from the shading correction section 12 is color image, the signal process section 41 achromatizes the image data and converts the achromatized image data into a brightness signal or a luminance signal.

For example, the signal process section 41 converts the RGB signals into a luminance signal Y in accordance with the following expression (1).

$$Y_i = 0.30 R_i + 0.59 G_i + 0.11 B_i \tag{1}$$

"Y" refers to a luminance signal of each pixel, and each of R, G, and B is a color component of the RGB signals, and "i" subsequently added to "Y" represents a value given to each pixel (i is an integer not less than 1).

Alternatively, the RGB signals may be converted into CIE1976L*a*b* signal (CIE: Commission International de l' Eclairage, L*: brightness, a*, b*: chromaticity).

The resolution changing section 42 scales up/down the input image data. For example, in case where the input image data is optically scaled up/down by the image input device 2, the resolution changing section 42 scales up/down the input image data again so as to have a predetermined resolution. Further, in order to reduce processes carried out by the subsequent processing sections, the resolution changing section 42 may change resolution so as to make the resolution lower than a resolution in being read by the image input device 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress an unnecessary high frequency component in extracting feature points by the subsequent centroid calculation section 45. That is, a mixing filter (not shown) is used to carry out an emphasizing process and a smoothing process. Note that, FIG. 4 illustrates an example of a filter coefficient of the mixing filter.

The binarization process section 44 compares achromatized image data (luminance value (luminance signal) or brightness value (brightness signal)) with a preset threshold value so as to binarize the image data.

Figure 5:
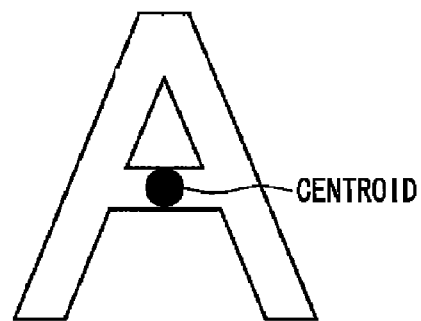
FIG. 5 is an explanatory drawing illustrating examples of a junction extracted by the feature point calculation section in the image processing apparatus in FIG. 2 from input image data and a centroid of the junction.
Figure 6:
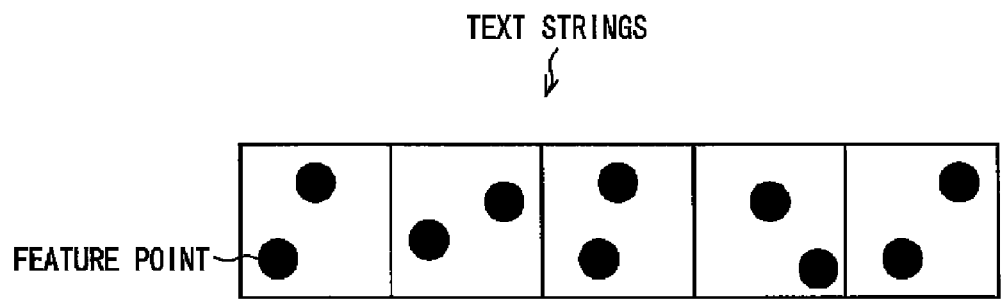
FIG. 6 is an explanatory drawing illustrating an example of centroids (feature points) of junctions extracted from a text sequence in input image data by the feature point calculation section in the image processing apparatus in FIG. 2.

The centroid calculation section 45 carries out labeling (labeling process) with respect to each pixel in accordance with the image data binarized by the binarization process section 44 (for example, the binarized data is represented by "1" or "0"). Further, a junction between pixels having the same label is specified and a centroid of the specified junction is extracted as a feature point. Further, the extracted feature point is outputted to the features calculation section 32. FIG. 5 is an explanatory drawing illustrating the junction extracted from the input image data and a centroid of the junction as an example. In this figure, the junction corresponding to a text sequence "A" and the centroid thereof are illustrated. Further, FIG. 6 is an explanatory drawing illustrating an example of centroids (feature points) of plural junctions extracted from a text sequence included in the input image data. Note that, the feature point can be expressed by coordinate values (X coordinate, y coordinate) of a binary image.

The features calculation section 32 includes a feature point extracting section 32$a$, an invariant calculation section 32$b$, and a hash value calculation section 32$c$. A feature point calculated by the feature point calculation section 31 is used to calculate features (hash value and/or invariant) which is invariable relative to geometric transformation such as rotation, parallel shift, scaling up, scaling down, parallel shift, and the like of a document image.

Figure 7:
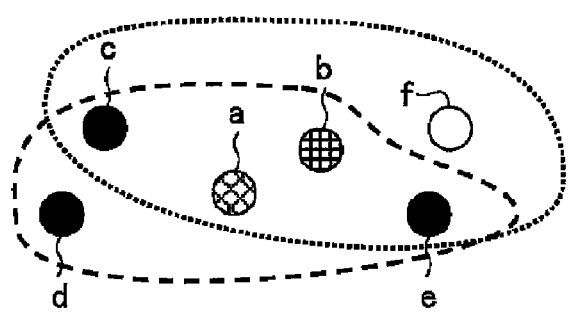
FIG. 7 is an explanatory drawing illustrating examples of a target feature point and a peripheral feature point that are extracted at a time when the features calculation section in the image processing apparatus in FIG. 2 calculates features.

As illustrated in FIG. 7, the feature point extracting section 32$a$ regards only one feature point as a target feature point and sequentially extracts peripheral feature points around the target feature point in such order that a feature point nearer to the target feature point is more preferentially extracted so as to extract a predetermined number of feature points (four feature points herein). In FIG. 7, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 8:
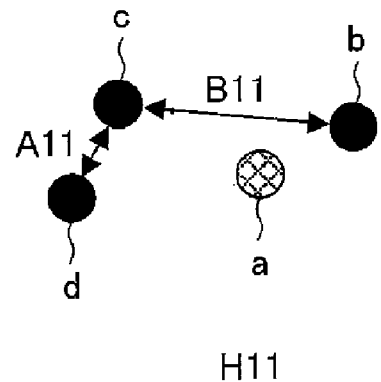
FIGS. 8(a) to 8(c) are explanatory drawings each illustrating an example of a combination of a target feature point and a peripheral feature point that are extracted at a time when the features calculation section in the image processing apparatus in FIG. 2 calculates features.
Figure 8:
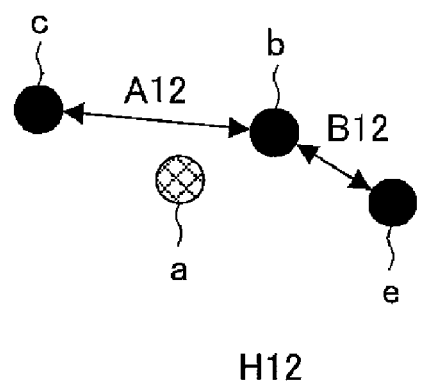
Figure 8:
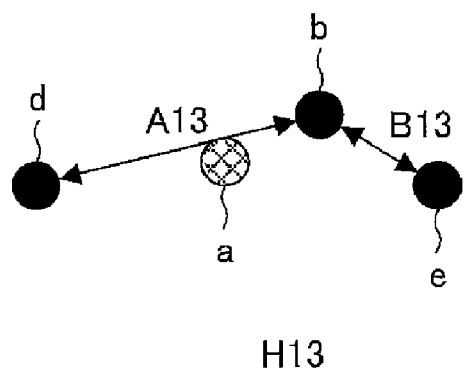

Further, the feature point extracting section 32$a$ extracts a combination of three points which can be selected from the four peripheral feature points extracted in the foregoing manner. For example, as illustrated in FIGS. 8($a$) to 8($c$), in case where a feature point a is regarded as a target feature point, a combination of three feature points b, c, and e, that is, a combination of peripheral feature points b, c, and d and a combination of peripheral feature points b, d, and e are extracted.

Next, the invariant calculation section 32$b$ calculates an invariant (one of features) Hij of the extracted combination relative to geometrical transformation. Herein, "i" represents the number indicative of each target feature point (i is an integer not less than 1), and "j" represents the number of combinations of three peripheral feature points. In the present embodiment, a ratio of lengths of two lines connecting the peripheral feature points is set as the invariant Hij. Note that, the lengths of the lines are calculated in accordance with coordinates of the peripheral feature points. For example, in FIG. 8($a$), when a length of a line connecting the feature point c and the feature point d is A11 and a length of a line connecting the feature point c and the feature point b is B11, the invariant H11 is such that H11=A11/B11. Further, in FIG. 8($b$), when a length of a line connecting the feature point c and the feature point b is A12 and a length of a line connecting the feature point b and the feature point e is B12, the invariant H12 is such that H12=A12/B12. Further, in FIG. 8($c$), when a length of a line connecting the feature point d and the feature point b is A13 and a length of a line connecting the feature point b and the feature point e is B13, the invariant H13 is such that H13=A13/B13. In this manner, the invariants H11, H12, and H113 are calculated in the examples illustrated in FIGS. 8($a$) to 8($c$). Note that, in the foregoing examples, a line connecting a peripheral feature point positioned at the left side in the horizontal direction and a peripheral feature point positioned at the center in the horizontal direction is indicated as Aij and a line connecting a peripheral feature point positioned at the center in the horizontal direction and a peripheral feature point positioned at the right side in the horizontal direction is indicated as Bij, but the definition is not limited to this, and the lines used to calculate the invariant Hij may be set in any manner.

Next, the hash value calculation section 32$c$ calculates a remainder of $(Hi1 \times 10^2 + Hi2 \times 10^1 + Hi3 \times 10^0)/D$ as a hash value (one of features) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that n≧5), or a value calculated in accordance with an arrangement of m points extracted from n points in the vicinity of the target feature point (m is such an integer that m<n and m≧5) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, an expression for calculating the hash value Hi is not limited to the foregoing expression (2), and other hash function (for example, any one of hash functions mentioned in Patent Document 4) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 9:
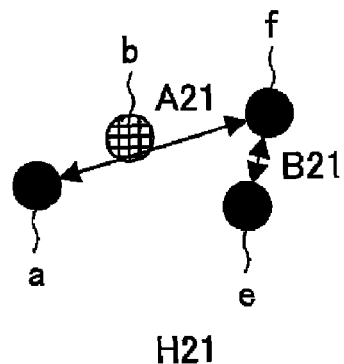
FIGS. 9(a) to 9(c) are explanatory drawings each illustrating an example of a combination of a target feature point and a peripheral feature point that are extracted at a time when the features calculation section in the image processing apparatus in FIG. 2 calculates features.
Figure 9:
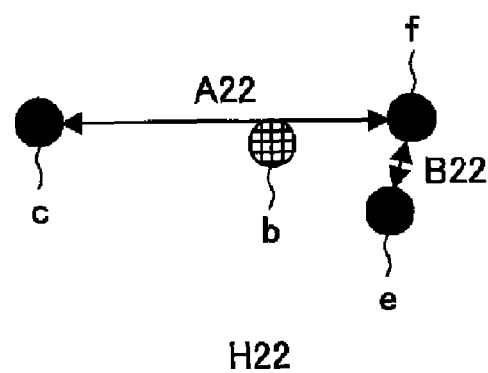
Figure 9:
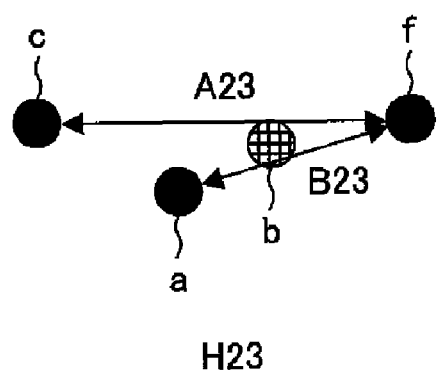

In FIG. 7, when extraction of peripheral feature points around a feature point a regarded as a target feature point and calculation of a hash value are completed, peripheral feature points around a feature point b regarded as a target feature point are extracted and a hash value is calculated. In FIG. 7, four feature points a, c, e, and f are extracted as peripheral feature points in case where the feature point b is regarded as a target feature point. Further, as illustrated in FIGS. 9(*a*) to 9(*c*), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Figure 20:
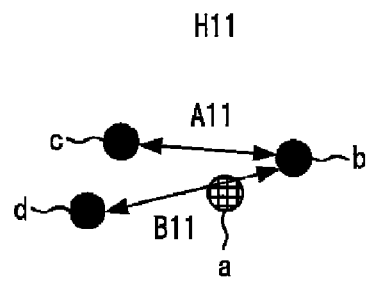
FIGS. 20(a) to 20(d) are explanatory drawings each illustrating an example of a combination of a target feature point and a peripheral feature point that are extracted at a time when the features calculation section in the image processing apparatus in accordance with an embodiment of the present invention calculates features.
Figure 20:
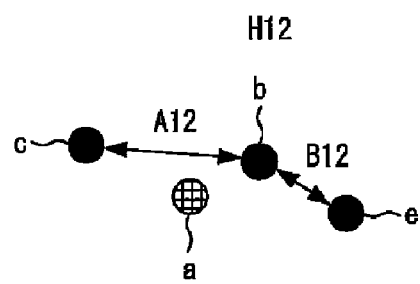
Figure 20:
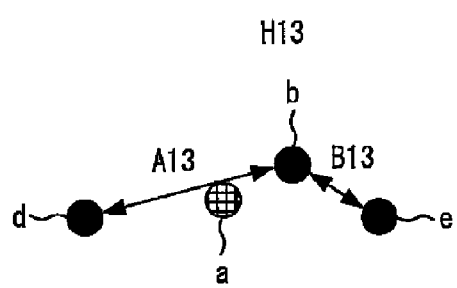
Figure 20:
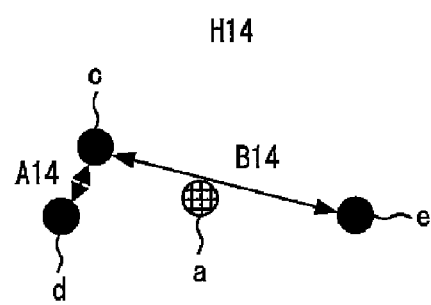

Note that, how to calculate the invariant when the feature point a is regarded as the target feature point is not limited to the aforementioned manner. For example, it may be so arranged that: as illustrated in FIG. 20(*a*) to FIG. 20(*d*), in case where the feature point a illustrated in FIG. 7 is regarded as the target feature point, a combination of three points out of peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of features) Hij relative to geometric transformation is calculated with respect to each of the extracted combinations.

Figure 21:
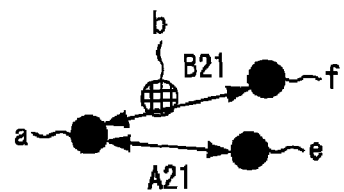
FIGS. 21(a) to 21(d) are explanatory drawings each illustrating an example of a combination of a target feature point and a peripheral feature point that are extracted at a time when the features calculation section in the image processing apparatus in accordance with an embodiment of the present invention calculates features.
Figure 21:
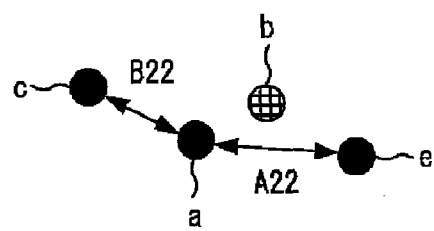
Figure 21:
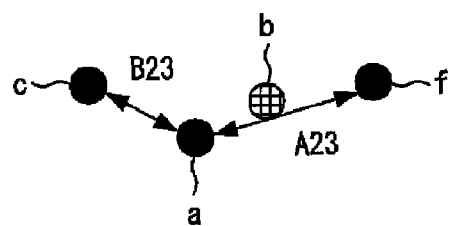
Figure 21:
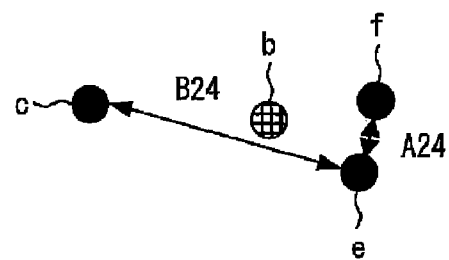

Further, it may be so arranged that: in case where the feature point b illustrated in FIG. 7 is regarded as the target feature point, as illustrated in FIGS. 21(*a*) to 21(*d*), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1 \times 10^3 + Hi2 \times 10^2 + Hi3 \times 10^1 + Hi4 \times 10^0)/D$ is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

Note that, in case of storing the input image data as a reference image, the features calculation section 32 transmits the hash value (features) calculated in the foregoing manner and corresponding to each feature point of the input image data to the storage process section 35.

The storage process section 35 sequentially stores (i) hash values calculated by the features calculation section 32 and corresponding to the respective feature points and (ii) indexes (document IDs) each indicative of a document (reference image) to the hash table 102 provided in the memory 8 (see FIG. 10(*a*)). In case where the hash values have already been stored, the document IDs are stored with them respectively corresponding to the hash values. The document IDs are serially assigned to the respective documents without any duplication. Note that, in case where the number of documents stored in the hash table 102 is larger than a predetermined value (for example, 80% of the number of documents which can be stored), old document IDs may be searched and sequentially deleted. Further, the deleted document IDs may be reused as document IDs of new reference images. Further, in case where the calculated hash values are identical to each other (H1=H5 in FIG. 10(*b*)), these values may be collectively stored into the hash table 102.

Further, in case of determining whether the input image data is identical to image data of an image having been already stored (similarity determination process), the features calculation section 32 transmits, to the voting process section 33, the hash value calculated in the foregoing manner and corresponding to each feature point.

Figure 11:
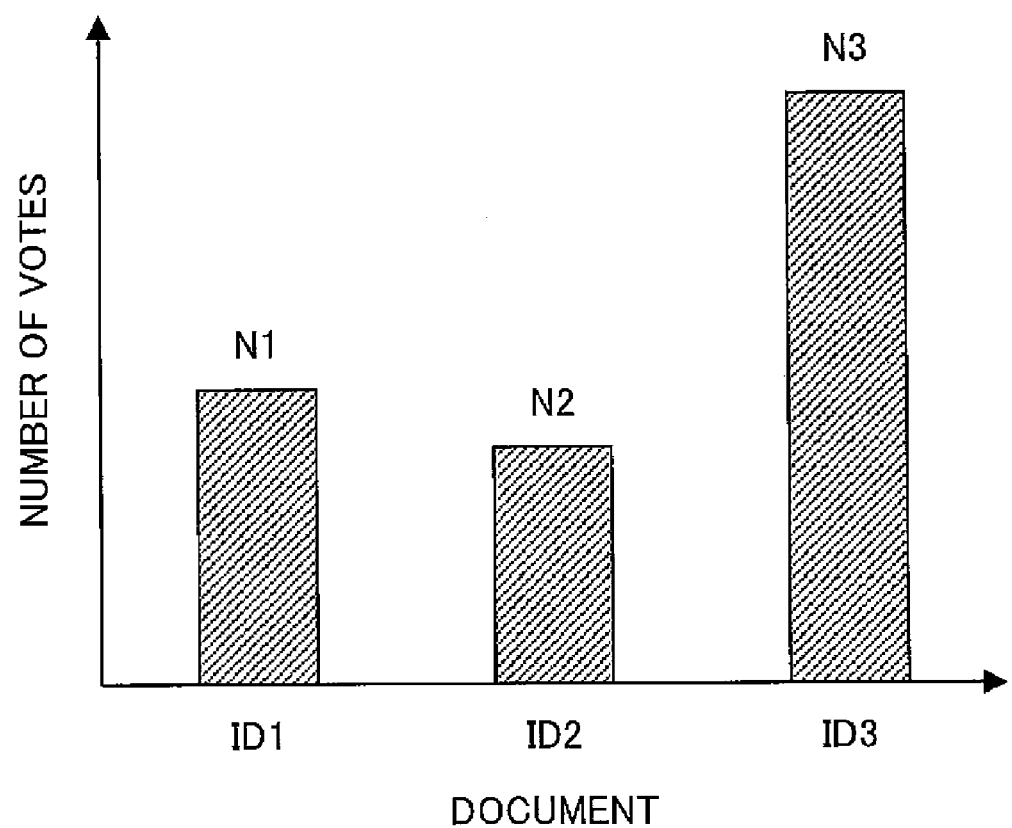
FIG. 11 is a graph showing an example of the number of votes for each reference image in a voting process section of the image processing apparatus in FIG. 2

The voting process section 33 compares the hash value calculated from the input image data and corresponding to each feature point with the hash value stored in the hash table 102 so as to vote for a reference image having the same hash value. In other words, there is counted the number of times the same hash value as a hash value of the reference image is calculated from the input image data for each reference image, and the counted number is stored in the memory 8. FIG. 11 is a graph illustrating an example of the number of votes for reference images ID1, ID2, and ID3.

The similarity determination process section 34 reads out a voting result of the voting process section 33 (an index of each reference image and the number of votes obtained for each reference image: similarity) from the memory 8, and extracts the maximum number of votes obtained and an index of a reference image obtaining the maximum number of votes. Further, the similarity determination process section 34 compares the maximum number of votes obtained with a predetermined threshold value so as to determine whether there is any similarity or not (whether the input image data is identical to image data of the reference image or not), and sends a determination signal indicative of the determination result to the control section 7. That is, in case where the maximum number of votes obtained is not less than a predetermined threshold value, it is determined that "there is similarity (the input image data is identical to image data of the reference image)", and in case where the maximum number of votes obtained is less than the threshold value, it is determined that "there is no similarity (the input image data is not identical to image data of the reference image)".

Alternatively, it may be so arranged that: the similarity determination process section 34 divides the number of votes obtained for each reference image by a total number of votes obtained (total number of feature points extracted from the input image data) and normalizes the result so as to calculate the similarity, thereby comparing the similarity with a predetermined threshold value (80% of the number of total votes obtained for example) to determine the similarity.

Further, it may be so arranged that: the similarity determination process section 34 divides the number of votes obtained for each reference image by the number of times of storage of a hash value (maximum number of times a hash value is registered) corresponding to a reference image whose hash value is most frequently stored and normalizes the result so as to calculate the similarity, thereby comparing the similarity with a predetermined threshold value (80% of the number of total votes obtained for example) to determine the similarity. That is, in case where the calculated similarity is not less than a threshold value TH2, it is determined that "there is similarity", and in case where the calculated similarity is less than the threshold value TH2, it is determined that "there is no similarity". Note that, in this case, the total number of hash values extracted from the input image data may be larger than the maximum number of times of storage of a hash value (particularly, a case where the document and/or the reference image partially has a handwritten part), so that the calculated value of the similarity may exceed 100%.

Further, the threshold value TH2 in determining the similarity may be constant for each reference image or may be set for each reference image in accordance with importance or the like of the reference image. As to the importance of the reference image, for example, a paper current, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value TH2 corresponding to the reference image obtaining the maximum number of votes.

Further, it may be so arranged that: in determining the similarity, the threshold value TH2 is made constant and the number of votes obtained for each reference image is multiplied by a weighting coefficient of each reference image so as to determine the similarity. In this case, the weighting coefficient according to the importance of each reference image is stored in the memory 8 with the weighting coefficient corresponding to an index of each reference image, and the similarity determination process section 34 calculates a corrected number of obtained votes by multiplying the number of votes obtained for each reference image by the weighting coefficient of the reference image, thereby determining the similarity in accordance with the corrected number of votes obtained. For example, a maximum corrected number of votes obtained may be compared with the threshold value TH2, or a value obtained by normalizing the maximum corrected number of obtained votes by the number of total votes obtained may be compared with the threshold value TH2, or a value obtained by normalizing the maximum corrected number of obtained votes by the maximum number of times of storage may be compared with the threshold value TH2. Further, in this case, for example, the weighting coefficient is set to be more than 1 and to be larger as the reference image is more important.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

(1-3. Processes in the Digital Color Multi-Functional Printer 1)

Figure 12:
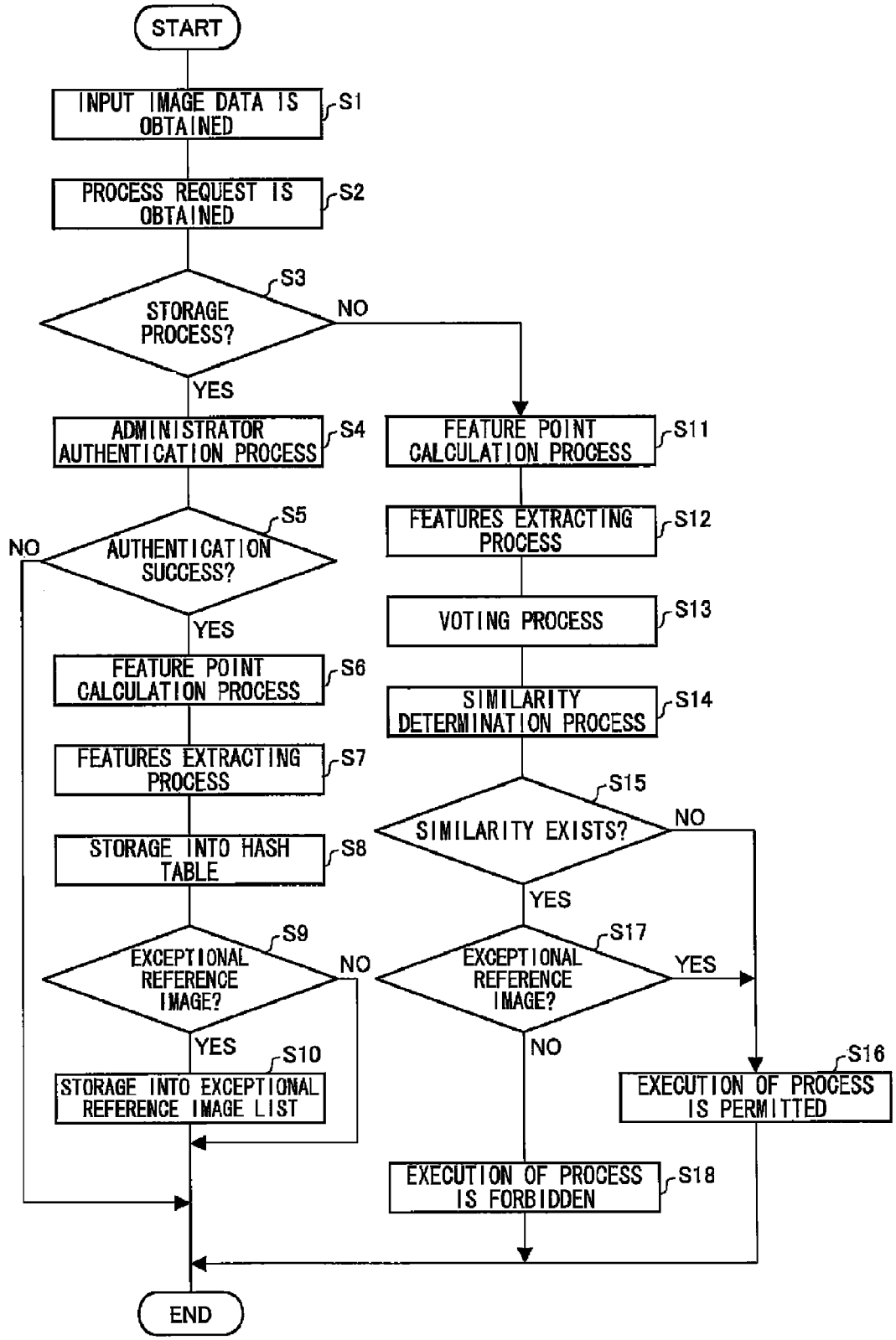
FIG. 12 is a flowchart illustrating a flow of a process in the image processing apparatus in FIG. 2.

Next, processes in the digital color multi-functional printer 1 are described as follows with reference to a flowchart of FIG. 12. Note that, the following explanation is based on such assumption that administrator information has been stored in the administrator information storage section 101 beforehand.

First, the control section 7 obtains input image data and a process request (instruction request) inputted by the user via the operation panel 6 or the communication device 5 (S12). Note that, input image data may be obtained by causing the color image input apparatus 2 to scan a document image, or input image data sent from an external device may be obtained by the communication device 5, or input image data may be read out and obtained from any one of various storage mediums via a card reader (not shown) or the like provided on the digital color multi-functional printer 1.

Next, the control section 7 determines whether a process requested at the process request is a storage process or not (S3). Further, in case where the process is the storage process, the control section 7 carries out an authentication process for determining whether or not the user requesting the process is an administrator stored in the administrator information storage section 101 (S4). For example, the control section 7 obtains user information (user ID, password, and the like) inputted by the user via the operation panel 6 or the communication device 5 and matches the obtained user information with the administrator information (user information of the administrator) stored in the administrator information storage section 101 so as to carry out the authentication process.

Further, the control section 7 determines whether the user succeeded in the authentication or not (S5). In case where it is determined that the user fails in the authentication, the process is ended. Note that, it may be so arranged that: in case where the user fails in the authentication, the user is permitted to input again the user information only a predetermined number of times so as to carry out the authentication process only the predetermined number of times.

While, in case where the user succeeds in the authentication in S4, the control section 7 controls the respective sections of the document matching process section 13 so as to carry out the feature point calculation process (S6) and the features calculation process (S7) for the input data obtained in S1 and stores the calculated features and a document ID (ID of a reference image) into the hash table 102 with the features and the document ID corresponding to each other (S8).

Next, the control section 7 determines whether the process requested at the process request is storage of a reference image (image whose process is forbidden or restricted) or storage of an exceptional reference image (image whose process is permitted) (S9).

Figure 13:
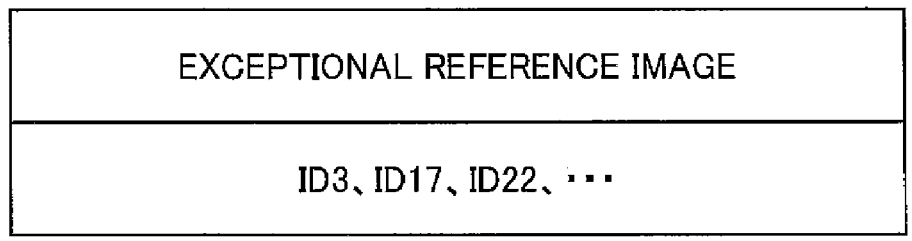
FIG. 13 is an explanatory drawing illustrating an example of an exceptional reference image list used in the image processing apparatus in FIG. 2.

Further, in case where the process is not storage of the exceptional reference image, the control section 7 ends the process. While, in case where the process is storage of the exceptional reference image, the control section 7 controls the storage process section 35 so as to store an ID of the corresponding image into the exceptional reference image list 103 (S10) and ends the process. FIG. 13 is an explanatory drawing illustrating an example of the exceptional reference image list 103.

In case where it is determined that the process is not the storage in S3, the control section 7 controls the respective sections of the document matching process section 13 so as to carry out, with respect to the input data obtained in S1, the feature point calculation process (S11), the features calculation process (S12), the voting process (S13), and the similarity determination process (S14). Further, the control section 7 determines whether or not it is determined that there is similarity as a result of the similarity determination process (S15). Further, in case where it is determined that there is no similarity, the control section 7 permits the image based on the input image data to be processed (copy, electronic distribution, facsimile transmission, filing, image data correction, image data edition, and the like) (S16) and ends the process.

While, in case where it is determined that there is similarity in S15, the control section 7 determines whether a reference image having highest similarity is an exceptional reference image or not as a result of the voting process (S17). That is, the control section 7 determines whether an ID of the reference image having highest similarity is stored in the exceptional reference image list 103 as a result of the voting process, thereby determining whether the reference image is stored in the exceptional reference image list 103. However, the arrangement is not limited to this, and it may be so arranged that: for example, in storing features and a document ID of a reference image into the hash table 102, a flag is given to the document ID (for example, a flag "1" is given in case where the reference image is an exceptional reference image, and a flag "0" is given in case where the reference image is not an exceptional reference image), and the control section 7 refers to the flag, thereby determining whether the reference image is the exceptional reference image or not.

Note that, it may be so arranged that the control section 7 causes input image data which is determined as having similarity in S15 and which is determined as non exceptional reference image in S17 to be stored into the administrator folder 8A. As a result, the administrator can easily confirm whether the determination result is appropriate or not by subsequently checking image data stored in the administrator folder 8A.

While, in case where it is determined that the reference image is not an exceptional reference image in S17, execution of image processing with respect to the input image data is forbidden (S18) and the process is ended. While, in case where it is determined that the reference image is an exceptional reference image in S15, execution of image processing with respect to the input image data is permitted (S16) and the process is ended.

As described above, the digital color multi-functional printer 1 according to the present embodiment stores therein both features of a reference image whose process is forbidden or restricted (restrictive reference image) and features of a reference image whose process is permitted (permissible reference image). Further, the digital color multi-functional printer 1 stores therein information indicative of whether each reference image is the reference image whose process is permitted or the reference image whose process is forbidden or restricted. Further, in case where it is determined that there is similarity as a result of the similarity determination on similarity between the input image data and the reference image, the control section 7 determines whether a reference image having highest similarity is the reference image whose process is permitted or the reference image whose process is forbidden or restricted, and forbids/restricts or permits the image processing in accordance with the determination result.

As a result, it is possible to cause the control section 7 to determine whether or not forbid/restrict the image processing in accordance with the content of the reference image having highest similarity (in accordance with whether the reference image is an exceptional reference image or not). This point is further detailed with reference to FIGS. 14(*a*) to 14(*c*) and FIGS. 15(*a*) to 15(*c*).

Figure 14:
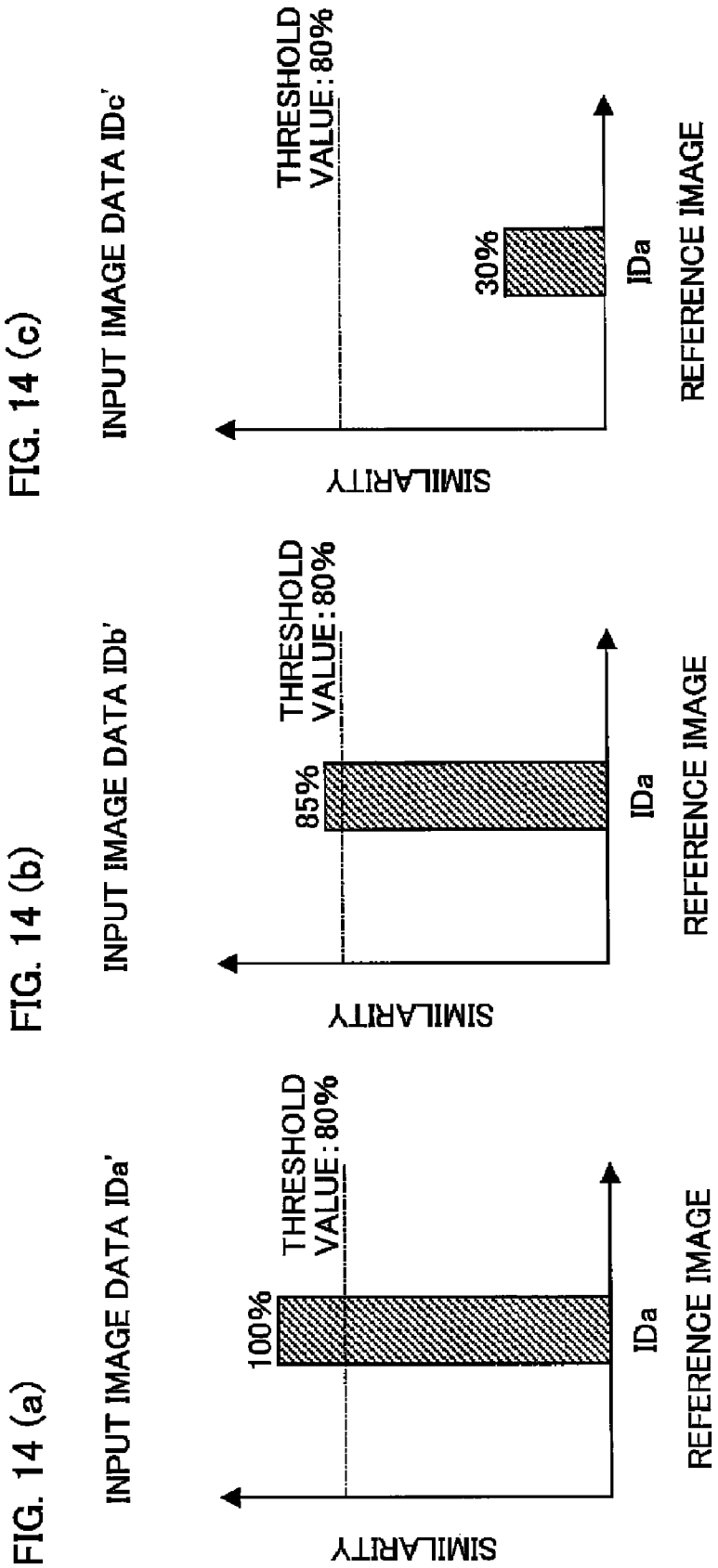
FIGS. 14(a) to 14(c) are explanatory drawings each illustrating an example of a similarity calculation result in the image processing apparatus in FIG. 2.

FIG. 14(*a*) is a graph illustrating a result of calculation of similarity of input image data IDa' corresponding to a reference image IDa in case where the reference image IDa is stored as a reference image whose process is forbidden and an exceptional reference image is not stored. FIG. 14(*b*) is a graph illustrating a result of calculation of similarity of input image data IDb' corresponding to a reference image IDa in case where the reference image IDa is stored as a reference image whose process is forbidden and an exceptional reference image is not stored. FIG. 14(*c*) is a graph illustrating a result of calculation of similarity of input image data IDc' corresponding to a reference image IDa in case where the reference image IDa is stored as a reference image whose process is forbidden and an exceptional reference image is not stored. Note that, the input image data IDa' is input image data obtained by causing a scanner to read the reference image IDa. Further, the IDb' is not a reference image but is obtained by causing a scanner to scan an image IDb whose similarity to the reference image is relatively high. Further, the IDc' is obtained by causing a scanner to scan an image whose similarity to the reference image is relatively low.

As illustrated in FIG. 14(*a*), the input image data IDa' is actually image data of a reference image IDa, so that its calculated similarity is high (in this example, the similarity is 100%). Thus, in this case, the input image data IDa' is determined as image data of the reference image IDa, so that the image processing with respect to the input image data IDa' is forbidden.

Further, as illustrated in FIG. 4(*b*), the input image data IDb' is actually not image data of a reference image but is obtained by scanning an image whose similarity to the reference image is relatively high, so that the calculated similarity is relatively high (in this example, 85%). Thus, the calculated similarity is higher than a threshold value of the similarity determination (in this example, 80%), so that the image processing thereof may be forbidden though the image data is not image data of the reference image originally.

Note that, as illustrated in FIG. 14(*c*), the similarity calculated with respect to the input image data IDc' is lower than the threshold value, so that the image processing is permitted.

Figure 15:
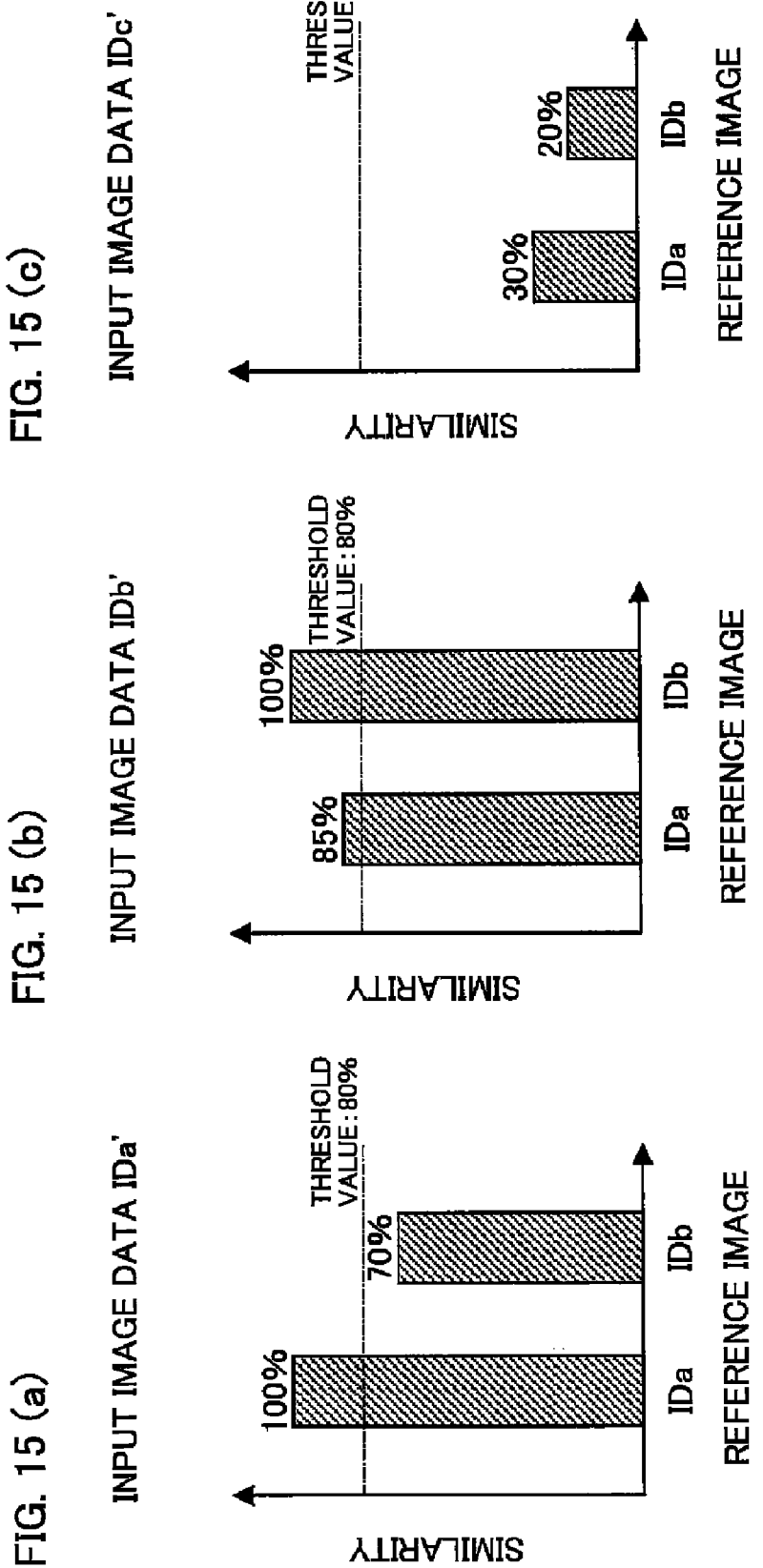
FIGS. 15(a) to 15(c) are explanatory drawings each illustrating an example of a similarity calculation result in the image processing apparatus in FIG. 2.

While, FIG. 15(*a*) is a graph illustrating a result of calculation of similarity of input image data IDa' with respect to a reference image IDa in case where the reference image IDa is stored as a reference image whose image processing is forbidden and a reference image IDb is stored as an exceptional reference image (reference image whose image processing is permitted). FIG. 15(*b*) is a graph illustrating a result of calculation of similarity of input image data IDb' with respect to a reference image IDa in case where the reference image IDa is stored as a reference image whose image processing is forbidden and a reference image IDb is stored as an exceptional reference image (reference image whose image processing is permitted). FIG. 15(*c*) is a graph illustrating a result of calculation of similarity of input image data IDc' with respect to a reference image IDa in case where the reference image IDa is stored as a reference image whose image processing is forbidden and a reference image IDb is stored as an exceptional reference image (reference image whose image processing is permitted).

As illustrated in FIG. 15(*a*), the input image data IDa' is actually image data of the reference image IDa, so that its similarity to the reference image IDa is highest (in this example, the similarity is 100%). Thus, in this case, the input image data IDa' is determined as image data of the reference image IDa, so that the image processing of the input image data IDa' is forbidden.

As illustrated in FIG. 15(*b*), the input image data IDb' is actually image data of the reference image IDb, so that its similarity to the reference image IDb is highest (in this example, the similarity is 100%). Note that, the similarity between the reference image IDb and the reference image IDa is relatively high, so that also the similarity between the input image data IDb' and the reference image IDa is relatively high (in this example, the similarity is 85%). However, the input image data is data obtained by scanning the reference image IDb, so that its similarity to the reference image IDa is not higher than its similarity to the reference image IDb. Thus, the input image data IDb' is determined as image data of the reference image IDb, so that the image processing thereof is permitted.

Note that, as illustrated in FIG. 15(c), the calculated similarity with respect to the input image data IDc' is lower than the threshold value, so that the image processing is permitted.

Thus, for example, as to input image data (input image data IDb') which has been erroneously determined as image data of a reference image though the image data is not image data of a reference image whose image processing is originally forbidden, the administrator stores the input image data as an exceptional reference image, so that the user can carry out the image processing of the input image data. That is, it is possible to prevent the image processing from being forbidden or restricted by erroneous determination.

Note that, in FIG. 15(b), both the similarity to the reference image IDb (100%) and the similarity to the reference image IDa (85%) exceed the threshold value (80%) of the similarity determination. Further, in the present embodiment, when the similarities to the plural reference images exceed the threshold value of the similarity determination, whether or not to forbid/restrict the image processing is determined in accordance with a reference image whose similarity is highest (in accordance with whether a reference image whose similarity is highest is an exceptional reference image or not). However, the arrangement is not limited to this. For example, in case where the similarity to the reference image whose image processing is forbidden or restricted exceeds a second threshold value (e.g., 90%) higher than the threshold value of the similarity determination or in case where a ratio of the similarity to the reference image whose image processing is forbidden or restricted with respect to a maximum value of similarity to the reference image whose image processing is permitted exceeds a predetermined value (e.g., 90%) or in case where a difference between the similarity to the reference image whose image processing is permitted and the similarity to the reference image whose image processing is forbidden or restricted is less than a predetermined value (e.g., 5%), even when the similarity to the reference image whose image processing is forbidden or restricted is lower than the similarity to the reference image whose image processing is permitted, the image processing may be forbidden or restricted. This makes it possible to improve the security of the reference image whose image processing is forbidden or restricted.

Further, in the present embodiment, when the similarity to the reference image whose image processing is forbidden or restricted is higher than the similarity to the exceptional reference image whose image processing is permitted even though the similarity to the reference image whose image processing is forbidden or restricted is higher than the threshold value of the similarity determination, the image processing is entirely permitted. However, the arrangement is not limited to this. For example, items of the image processing may be set (for example, a part out of copying, printing, filing, image data correction, image data edition is permitted but other processes are not permitted) in case where the similarity to the reference image whose image processing is forbidden or restricted is equal to or higher than the threshold value and the similarity to the exceptional reference image whose image processing is permitted is higher than that similarity. In this case, an ID of the exceptional reference image and information indicative of permissible items of the image processing are stored in the exceptional reference image list 103 with the ID and the information corresponding to each other, and the control section 7 determines whether or not to allow the image processing in accordance with requested items of the image processing and information stored with it corresponding to the exceptional reference image.

Further, the present embodiment described the arrangement in which the image processing is essentially forbidden in case where it is determined that there is a similarity to the reference image and the image processing is exceptionally permitted in case where the reference image is an exceptional reference image. However, the arrangement is not limited to this. For example, it may be so arranged that, for example, the image processing is essentially permitted in case where it is determined that there is a similarity to the reference image (the image processing is forbidden in case where there is no similarity), and the image processing is forbidden or restricted in case where the reference image is an exceptional reference image.

Furthermore, in the present embodiment, an explanation was made as to a case where the present invention is applied to the digital color multi-function printer 1. However, the present invention is not limited to this case. For example, the present invention is applicable to a monochrome multi-function printer. Furthermore, in addition to the monochrome multi-function printer, the present invention is applicable to a single-function apparatus such as a facsimile, a copier, and an image reading apparatus.

Figure 16:
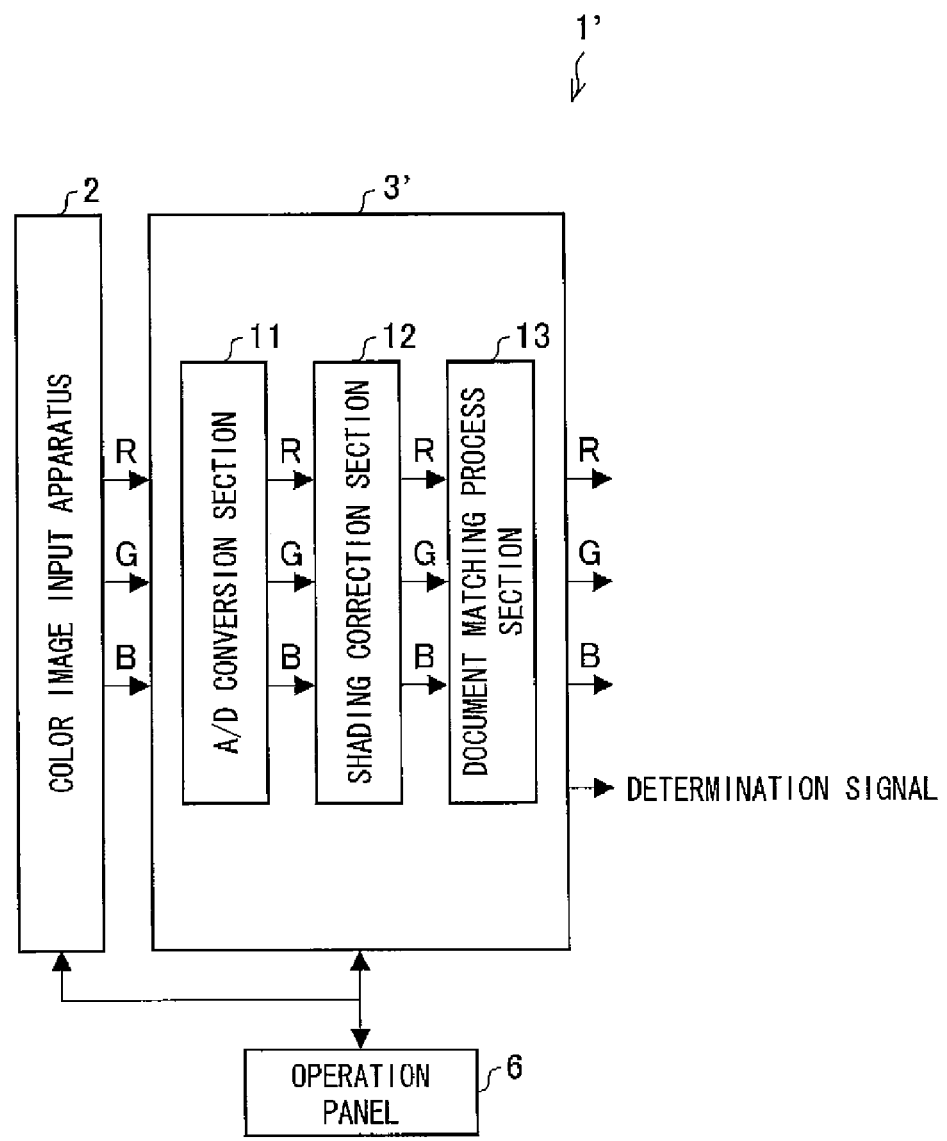
FIG. 16 is a block diagram illustrating a modification example of an image processing apparatus in accordance with an embodiment of the present invention.

FIG. 16 is a block diagram illustrating an example of a structure in a case where the present invention is applied to a flat bed scanner (image reading apparatus, image processing apparatus) 1'.

As illustrated in FIG. 16, the flat bed scanner 1' includes a color image input apparatus 2 and a color image processing apparatus 3'. The color image processing apparatus 3' includes an A/D conversion section 11, a shading correction section 12, a document matching process section 13, a control section 7 (not shown in FIG. 16), and a memory 8 (not shown in FIG. 16). The color image input apparatus 2 is connected to the color image processing apparatus 3', and the color image input apparatus 2 and the color image processing apparatus 3' constitute the image reading apparatus 1' as a whole. Functions of the A/D conversion section 11, the shading correction section 12, the document matching process section 13, the control section 7, and the memory 8 included in the color image input apparatus (image reading means) 2 are the same as those of the members in the digital color multi-function printer 1 as described above and explanations thereof are omitted here.

In the present embodiment, an explanation was made as to a case where the administrator folder 8A is included in the digital color multi-function printer 1. However, the present invention is not limited to this case. For example, the administrator folder 8A may be provided in an external device (such as server) communicably connected to the digital color multi-function printer 1.

Figure 17:
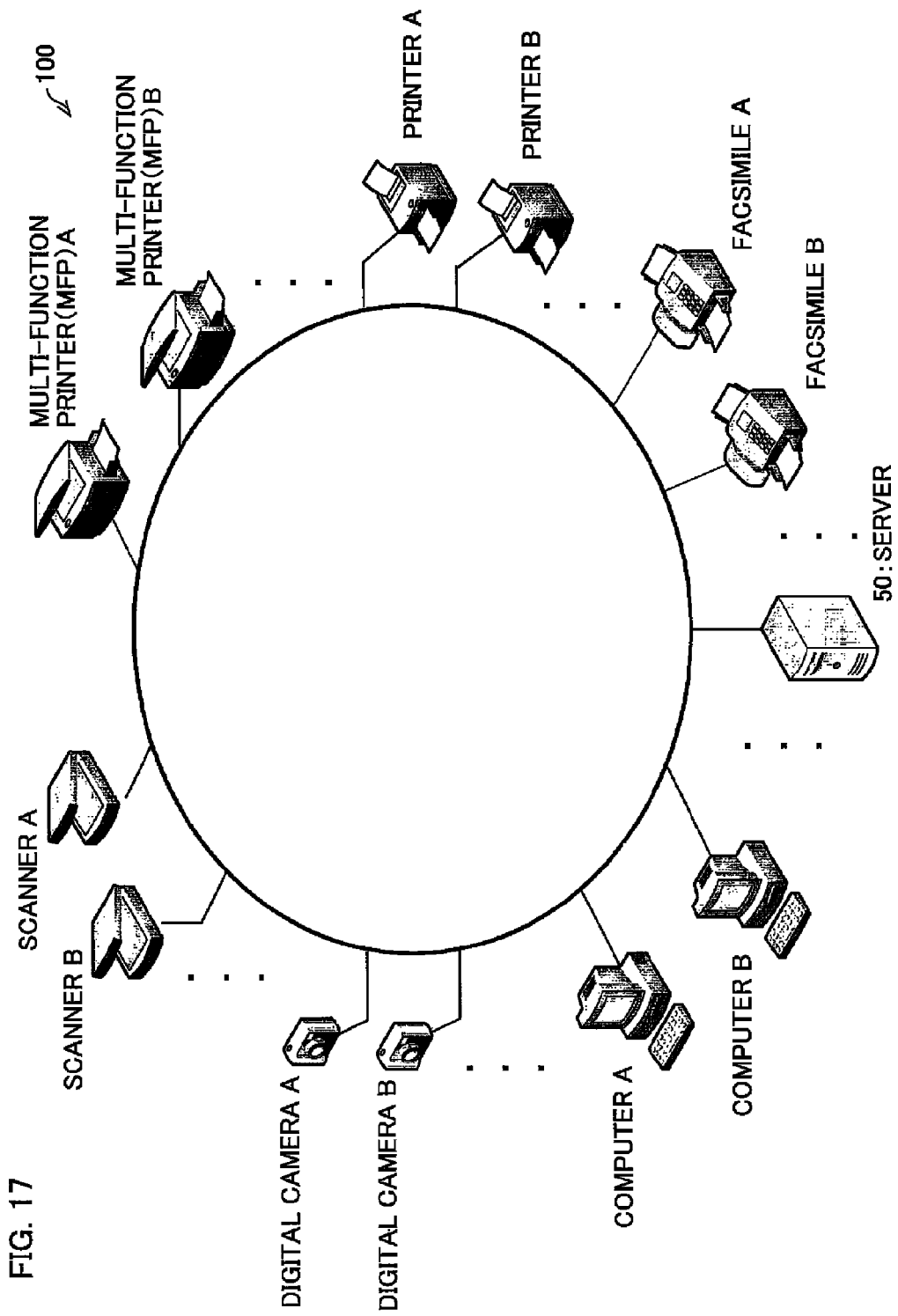
FIG. 17 is an explanatory drawing illustrating a structure of an image processing system in accordance with an embodiment of the present invention.

FIG. 17 is an explanatory drawing illustrating a structure of an image processing system 100 including: a server 50 having the administrator folder 8A; multi-function printers (MFPs) A, B, . . . ; facsimiles A, B, . . . ; computers A, B, . . . ; digital cameras A, B, . . . ; and scanners A, B, . . . . The structure of the image processing system 100 is not limited to this. For example, the image processing system 100 may include the server 50 and at least one of a multi-function printer, a printer (image forming apparatus), a facsimile, a computer, a digital camera (image reading apparatus), and a scanner (image reading apparatus).

The scanner includes a scanner platen, an optical scanning section, CCD (charge coupled device) etc. The scanner scans a document image on the scanner platen with use of the optical scanning section, thereby reading the document image and forming image data. The digital camera includes an image sensing lens, a CCD (image input device) etc. The digital camera senses a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution change process, and rotation on image data supplied from the image input device to obtain image data compressed into a predetermined format and sends the image data to the other end, or the facsimile receives image data from the other end, decompresses the image data, performs a rotation process, a resolution change process, and a halftone process on the image data in accordance with performance of an image output device, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

Each of the devices connected to the server 50 via a network include a control section 7 and a document matching process section 13. In a case where it is determined that there is similarity (input image data is identical to image data of a reference image) as a result of the similarity determination, the control section 7 causes input image data, device ID (information for specifying a device that transmits input image data to the server 50) etc. to be transmitted to the server 50, and a control section (not shown) of the server 50 stores received information in the administrator folder 8A provided in the server 50. In the case where it is determined that there is similarity, when the user requests continuation of the process and when continuation of the process is permitted as a result of the user authentication, the control section 7 causes a log regarding the input image data, the device ID etc. to be transmitted to the server 50, and the control section (not shown) of the server 50 stores received information in the administrator folder 8A provided in the server 50.

In the present embodiment, an explanation was made as to a case where the similarity determination process is performed in the document matching process section 13 provided in the digital color multi-function printer 1. However, the present invention is not limited to this case. For example, a part of or all of the functions of the control section 7 and the document matching process section 13 may be performed in an external device communicably connected to the digital color multi-function printer 1.

Figure 18:
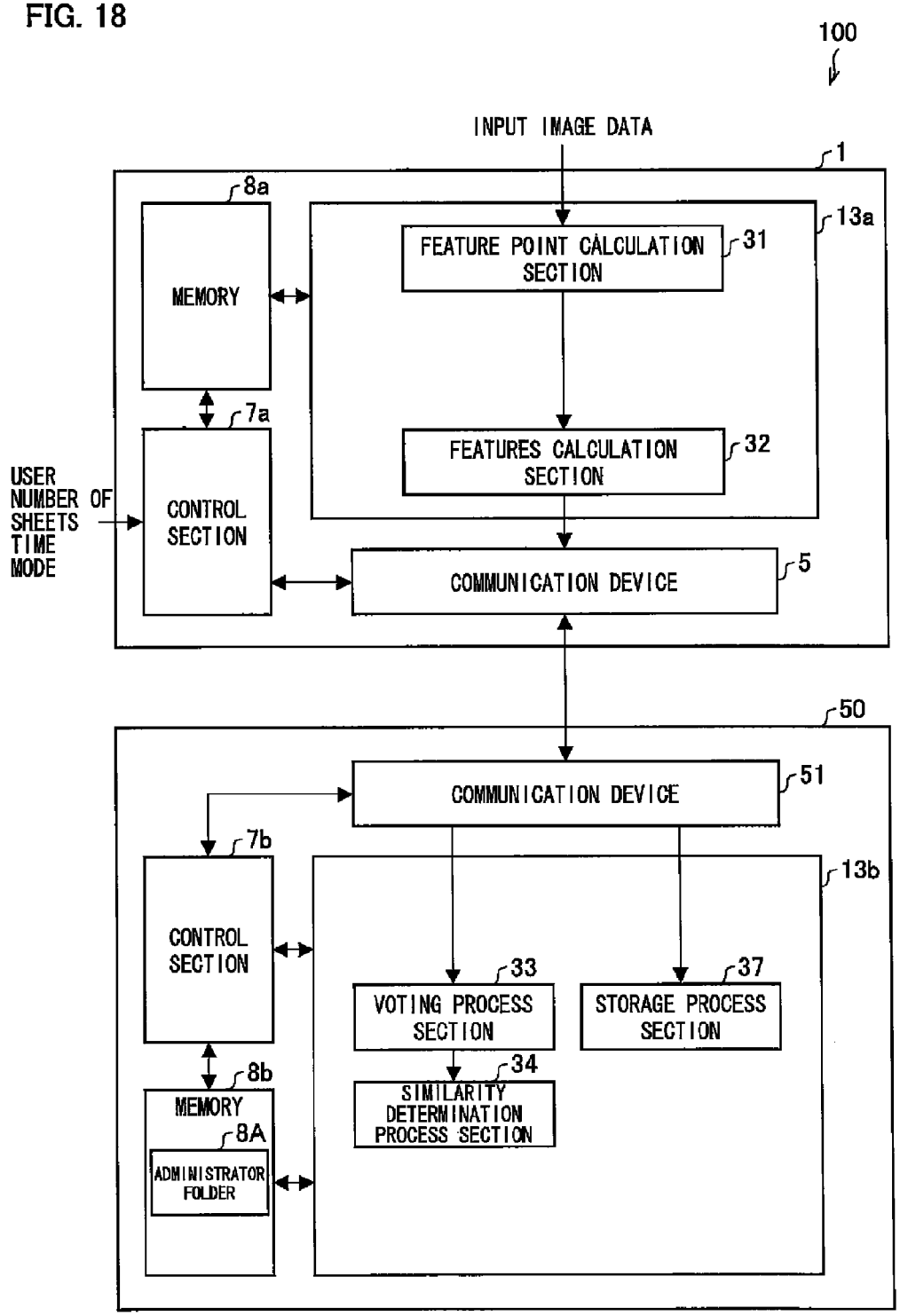
FIG. 18 is a block diagram illustrating an example of a structure of an image processing system in accordance with an embodiment of the present invention.
Figure 19:
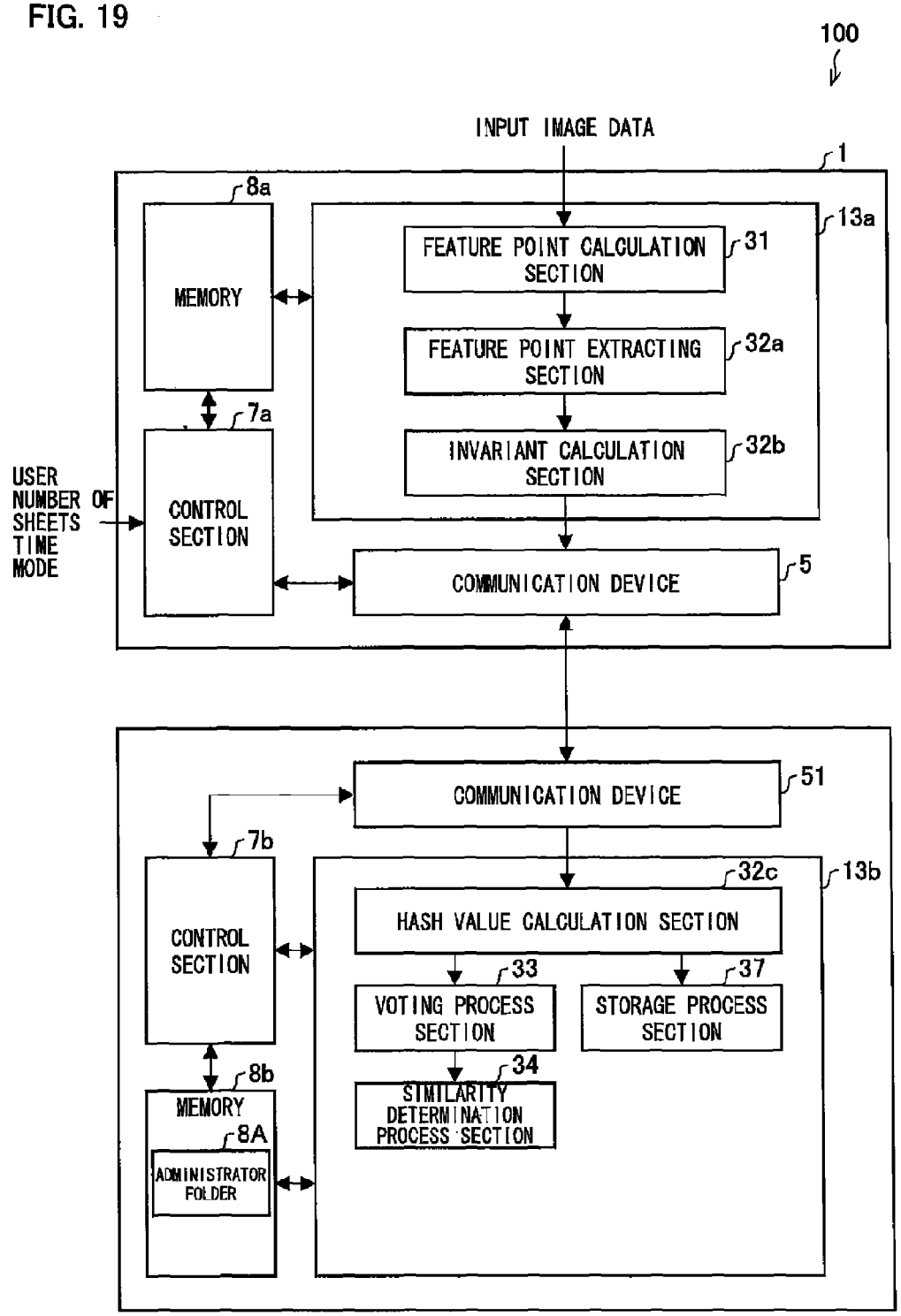
FIG. 19 is a block diagram illustrating another structure example of an image processing system in accordance with an embodiment of the present invention.

FIG. 18 is a block diagram illustrating an example of a structure in a case where a part of the functions of the control section 7 and the document matching process section 13 is included in the server 50.

As illustrated in FIG. 18, the color image processing apparatus 3 of the digital color multi-function printer 1 includes: a document matching process section 13*a* including a feature point calculation section 31 and a features calculation section 32; a control section 7*a* for controlling the operation of the document matching process section 13*a*; a memory 8*a* for storing information necessary for the process of the document matching process section 13*a*; and a communication device 5 for communicating with an external device. The server 50 includes: a communication device 51 for communicating with an external device; a document matching process section 13*b* including a voting process section 33, a similarity determination process section 34, and a compressing/decompressing section 35; a control section 7*b* for controlling the document matching process section 13*b*; and a memory 8*b* for storing information necessary for the process of the document matching process section 13*b*. In a case where transmission/reception of data is required between functional blocks of the digital color multi-function printer 1 and functional blocks of the server 50, the control sections 7*a* and 7*b* control the communication devices 5 and 51, respectively, so that transmission/reception of data is performed suitably. Other functions are the same as those already explained above.

In the example of FIG. 18, all members of the features calculation section 32 (feature point extracting section 32*a*, invariant calculation section 32*b*, and hash value calculation section 32*c*) are included in the digital color multi-function printer 1. Alternatively, the present invention may be arranged so that the feature point extracting section 32*a* and the invariant calculation section 32*b* are provided in the digital color multi-function printer 1 and the hash value calculation section 32*c* is provided in the server 50.

Alternatively, the present invention may be arranged so that members of the features calculation section 32 are provided in the server 50, data indicative of a feature point calculated by the feature point calculation section 31 is transmitted from the digital color multi-function printer 1 to the server 50, and the features calculation section 32 provided in the server 50 calculates a hash value based on the hash table 103 stored in the memory 8*b* and the received data indicative of the feature point. Alternatively, the present invention may be arranged so that members of the feature point calculation section 31 and the features calculation section 32 are provided in the server 50, input image data is transmitted from the digital color multi-function printer 1 to the server 50, and the feature point calculation section 31 and the features calculation section 32 calculate a hash value based on the input image data received from the server 50 and the hash table 103 stored in the memory 8*b*.

The above explanation was made as to a case of performing the similarity determination process. In a case of performing the storage process, the storage process section 37 provided in the server 50 stores, in the hash table 103 provided in the memory 8*b*, a document ID received from the digital color multi-function printer 1 and a hash value (or a hash value calculated by the hash value calculation section 32*c* provided in the server 50). Whether to perform the similarity determination process or the storage process may be determined in such a manner that a user of the digital color multi-function printer 1 designates one of the processes via the operation panel 6 and a signal indicative of the designated process is sent to the server 50. Alternatively, the server 50 may perform the storage process on an input image which the server 50 has determined has no similarity as a result of the similarity determination process.

In the case where the hash value calculation section 32*c* is provided in the server 50, the present invention may be arranged so that a hash value is calculated through a method different from the method for calculating hash values stored in the hash table 103 (calculated using a different hash function), and the hash table 103 is updated using the calculated hash value. Consequently, a suitable hash value obtained by referring to features (invariant) in accordance with the kind etc. of the document image can be stored (updated) in the hash table 103, allowing the vote process using the stored hash value. This allows an increase in matching accuracy (accuracy in similarity determination).

Furthermore, in the present embodiment, input image data is stored in the administrator folder BA when it is determined that there is similarity as a result of the similarity determination. In addition, text information extracted from the input image data through an OCR (Optical Character Recognition) may be stored in the administrator folder 8A. At that time, the digital color multi-function printer 1 is provided with an OCR section for extracting text information (text data) from the input image data, and the control section 7 stores the text data extracted by the OCR section in the administrator folder 8A.

Embodiment 2

The following explains another embodiment of the present invention. For convenience of explanation, members having the same functions as those in Embodiment 1 are given the same reference numerals and explanations thereof are omitted here.

Figure 22:
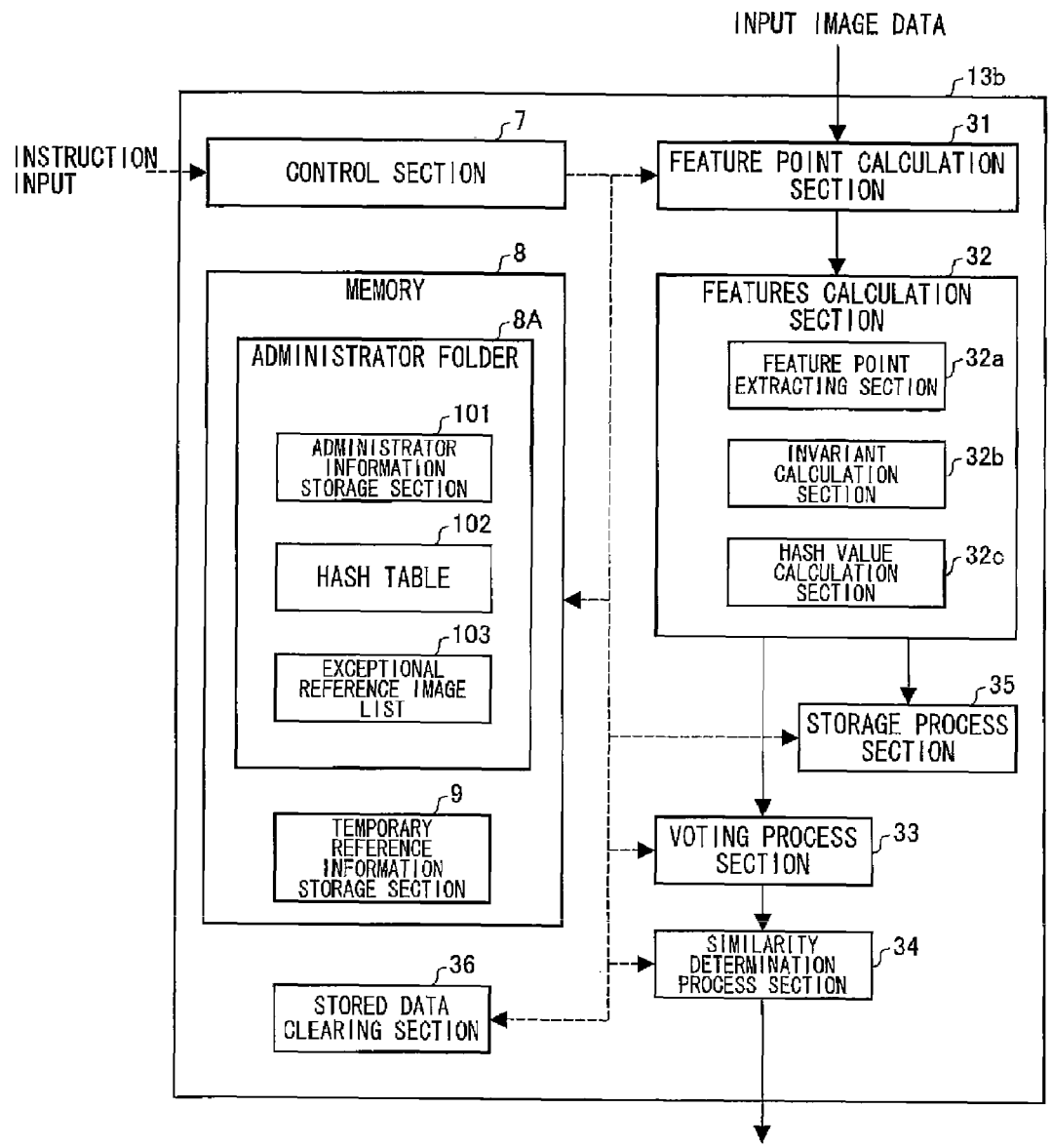
FIG. 22 is a block diagram schematically illustrating a structure of a document matching process section included in an image processing apparatus in accordance with another embodiment of the present invention.

FIG. 22 is a block diagram schematically illustrating a document matching process section 13b included in the digital color multi-function printer 1 according to the present embodiment. Note that, the digital color multi-function printer 1 according to the present embodiment is arranged in the same manner as in the digital color multi-function printer 1 of Embodiment 1 except that the document matching process section 13b is provided instead of the document matching process section 13.

As illustrated in FIG. 22, the document matching process section 13b includes a temporary reference information storage section 9 and a stored data clearing section 36, which are provided in the memory 8, unlike the document matching process section 13 of Embodiment 1.

In Embodiment 1, the similarity determination process section 34 calculates the number of votes obtained for each reference image in accordance with the voting result of the voting process section 33 so as to determine whether or not there is similarity to such a reference image that the number of votes obtained is not less than a threshold value and the number of votes obtained is maximum. However, if this determination method is solely adopted, it may be impossible to accurately determine the similarity to the reference image.

This point will be detailed taking a specific example. FIG. 23(a) is an explanatory drawing illustrating: a match target image a included in the input image data; reference images A and B; voting results obtained by causing the voting process section 33 to vote for reference images A and B corresponding to the match target image a. Note that, the match target image a is the same image as the reference image B. Further, FIG. 23(b) is an explanatory drawing illustrating: a match target image α' included in the input image data; reference images A' and B'; voting results obtained by causing the voting process section 33 to vote for reference images A' and B' corresponding to the match target image α'. Note that, the match target image α' is the same image as the reference image B'.

As illustrated in FIG. 23(a), in case where the similarity between the reference images A and B is low, an identical part of each reference image and the match target image a is relatively small with respect to the entire image, and a different part thereof is relatively large. In this case, as illustrated by the voting result in FIG. 23(a), even when a vote caused by a noise is included in the result of votes obtained for both the reference images, there is greater difference in the number of votes obtained for the different part, so that erroneous determination is less likely to occur.

While, as illustrated in FIG. 23(b), in case where the similarity between the reference images A' and B' is relatively high, an identical part between each reference image and the match target image a' is relatively large with respect to the entire image, and a different part thereof is relatively small. In this case, as illustrated by the voting result, there is a smaller difference in the number of votes obtained for the different part. Thus, when a vote caused by a noise is included in the result of votes obtained for both the reference images, erroneous determination is likely to occur. Note that, it is difficult to specify the number of votes obtained for both the reference images as a difference caused by a noise or a difference based on a difference between actual image contents.

Thus, in the present embodiment, in storing a restrictive reference image or a permissible reference image, first, a newly stored image is temporarily stored, and then it is determined whether or not there is similarity between (i) an image obtained by causing the color image reading apparatus 2 to reread the newly stored image and (ii) the reference image having been stored and the temporary reference image. Further, the temporary reference image is stored in case where a difference between the similarity to the reference image having been stored and the similarity to the temporary reference image is not less than a threshold value, and it is determined that discrimination cannot be performed and the temporary reference image is not stored in case where the difference is less than the threshold value.

The temporary reference information storage section 9 is a memory for storing an ID (temporary reference identifier, temporary reference ID) of the temporary reference image and features with them corresponding to each other. Note that, features of the temporary reference image may be stored in the hash table 102 with the features corresponding to the temporary reference identifier ID or may be stored in a table (not shown) different from the hash table 102 with the features corresponding to the temporary reference identifier ID.

In case where it is determined that the temporary reference image cannot be discriminated, the stored data clearing section 36 deletes the temporary reference identifier ID and the features of the image from the temporary reference information storage section 9. Note that, in case where the features are stored in the hash table 102 or other table, the stored data clearing section 36 clears the temporary reference identifier ID from the temporary reference information storage section 9 and deletes the features stored in the hash table 102 or other table.

Figure 23:
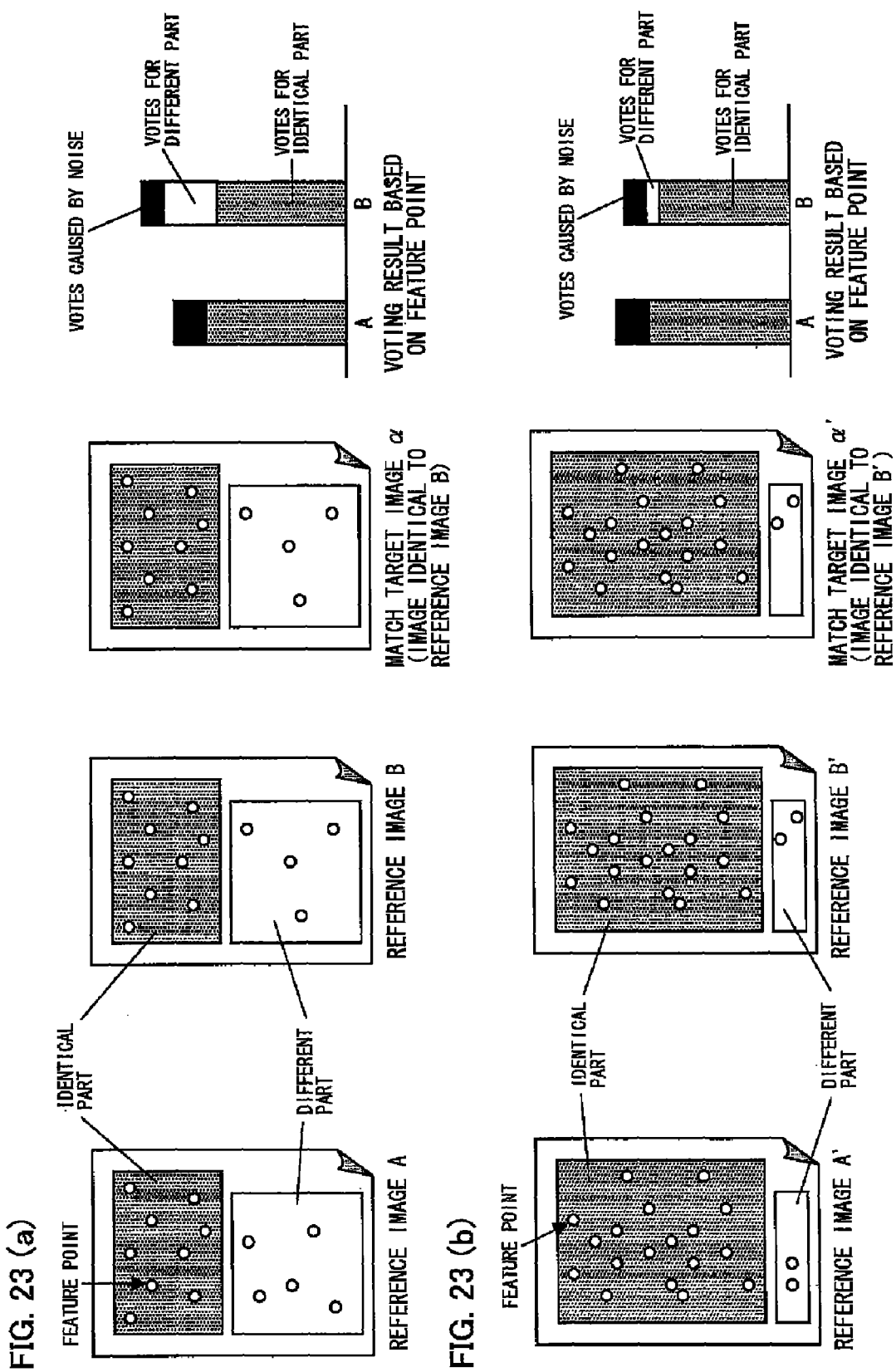
FIGS. 23(a) and 23(b) are explanatory drawings each illustrating an example of a match target image which is to be matched by the document matching process section in FIG. 1, a reference image, and a voting result.
Figure 24:
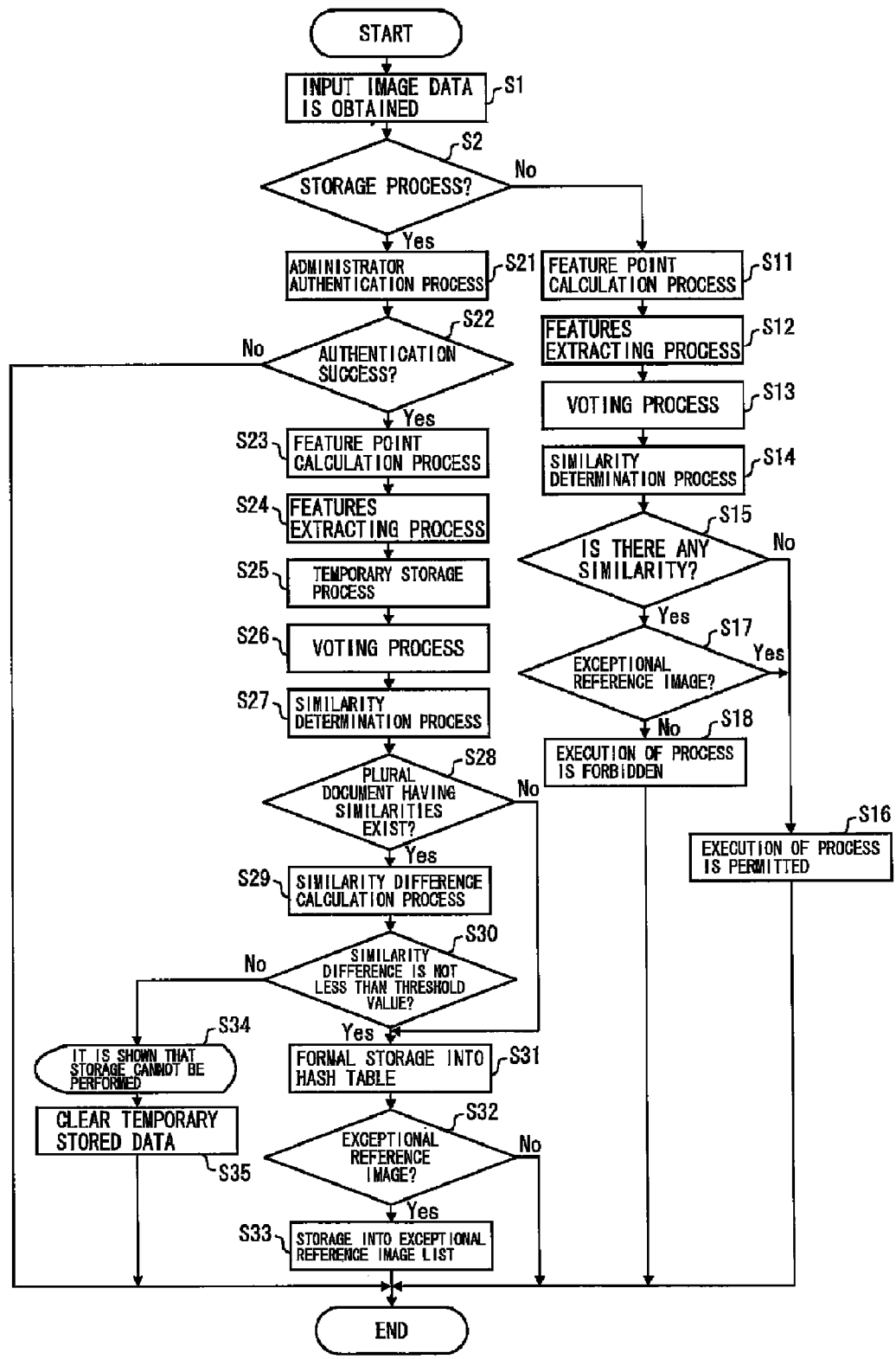
FIG. 24 is a flowchart illustrating a flow of a process in the document matching process section in FIG. 22.

FIG. 23 is a flowchart illustrating a flow of a process in the document matching process section 13b.

First, as in Embodiment 1 (see FIG. 12), the control section 7 obtains input image data and a process request (instruction input) inputted by the user via the operation panel 6 or the communication device 5 (S1, S2) and determines whether the process requested at the process request is a storage process or not (S3). Further, in case where the process is not the storage process, processes S11 to S18 of FIG. 12 are carried out.

While, in case where the process is the storage process, the control section 7 carries out an authentication process for determining whether the user requesting the process is an administrator stored in the administrator information storage section 101 or not (S21). For example, the control section 7 obtains user information (user ID, password, and the like) inputted by the user via the operation panel 7 or the communication device 5 and matches the obtained user information to the administrator information (user information of the administrator) stored in the administrator information storage section 101.

Further, whether the authentication results in success or not is determined (S22). In case where it is determined that the authentication results in failure, the process is ended.

While, in case where the authentication results in success in S21, the control section 7 controls each section of the document matching process section 13 so that a feature point calculation process (S23) and a features calculation process (S24) are carried out with respect to the input data obtained in S1 and a temporary reference identifier ID and features of the document are stored in the storage section 9 (S25).

Next, image data obtained by causing the color image input apparatus 2 to read again the temporary reference document is obtained, and a feature point and features of the image obtained by the rereading are calculated, and a voting process (S26) and a similarity determination process (S27) are carried out with respect to the reference image stored in the hash table 102 and the temporary reference image stored in the temporary reference information storage section 9.

Further, it is determined whether or not there are plural documents determined as having similarities as a result of the similarity determination process (S28). Herein, in case where it is determined that there are not plural documents determined as having similarity, the control section 7 carries out S31 and subsequent processes which will be described later.

While, in case where it is determined that there are plural documents determined as having similarities, the control section 7 calculates a difference between the similarities to the documents determined as having similarities (S29) and determines whether the difference is not less than a predetermined threshold value (S30). Note that, in the present embodiment, the threshold value is 5% of a similarity of a document having the maximum number of votes obtained.

Further, in case where it is determined that there are not plural documents determined as having similarities in S28 and in case where it is determined that the difference is not less than the threshold value in S30, the control section 7 determines that the temporary reference document can be discriminated and controls the storage process section 35 so that the temporary reference document is formally stored into the hash table 102 (S31). For example, in case where the temporary reference identifier ID and the features are stored in the temporary reference information storage section 9, the features and the ID to be formally stored are stored into the hash table 102 with them corresponding to each other. Further, in case where the temporary reference identifier ID and the features are stored in the hash table 102 with them corresponding to each other, the stored temporary reference identifier ID is changed into an ID to be formally stored. Further, it may be so arranged that, after formally storing the temporary reference identifier ID into the hash table 102, the control section 7 controls the stored data clearing section 36 so as to clear information stored in the temporary reference information storage section 9.

Thereafter, the control section 7 determines whether the process requested at the process request is a storage process carried out with respect to a reference image (image which forbids or restricts execution of the process) or an exceptional reference image (image which permits execution of the process) (S32). Further, in case where the requested process is not the storage process carried out with respect to the exceptional reference image, the control section 7 ends the process. While, in case where the process is the storage process carried out with respect to the exceptional reference image, the control section 7 controls the storage process section 35 so as to store the image ID into the exceptional reference image list 103 (S33) and ends the process.

While, in case where it is determined that the difference is less than the threshold value in S30, the control section 7 determines that the temporary reference document cannot be discriminated and causes a display section of the operation panel 6 to show that the temporary reference document cannot be stored (S34) and controls the stored data clearing section 36 so as to clear information stored in the temporary reference information storage section 9, and ends the process.

Note that, it may be so arranged that: in case where it is determined that there are plural documents determined as having similarities in S28, it is determined whether both a permissive reference image and a restrictive reference image are included in the plural documents or not, and in case where both the images are included, S29 and subsequent processes are carried out, and in case where one of the images is included, S31 and subsequent processes are carried out.

Further, in each of the embodiments, each section (each block) constituting the document matching process section and the control section which are provided on the digital color multi-functional printer 1 and/or the server 50 is realized by software using a processor such as a CPU or the like. That is, the digital color multi-functional printer 1 and/or the server 50 includes: a CPU (central processing unit) which executes a control program realizing the functions; a ROM (read only memory) in which the program is stored; a RAM (random access memory) which develops the program; a storage device (storage medium) such as a memory in which the program and various kinds of data are stored; and the like. Further, the object of the present invention can be achieved as follows: a storage medium for computer-readably storing a program code (an execute form program, intermediate code program, or source program) of the control program of the digital color multi-functional printer 1 and/or the server 50 which is software for implementing the aforementioned functions is provided to the digital color multi-functional printer 1 and/or the server 50, and a computer (or CPU and MPU) reads out the program code stored in the storage medium so as to implement the program, thereby achieving the object of the present invention.

Examples of the storage medium which satisfies these conditions include: tapes, such as magnetic tape and cassette tape; disks including magnetic disks, such as floppy disks (registered trademark) and hard disk, and optical disks, such as CD-ROMs, magnetic optical disks (MOs), mini disks (MDs), digital video disks (DVDs), and CD-Rs; cards, such as IC card (including memory cards) and optical cards; and semiconductor memories, such as mask ROMs, EPROMs, EEPROMs, and flash ROMs.

Further, it may be so arranged that: the digital color multi-functional printer 1 and/or the server 50 is made connectable to communication networks, and the program code is supplied via the communication networks. The communication networks are not limited to a specific means. Specific examples of the communication network include Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with IEEE1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with Bluetooth standard (registered trademark) or IEEE802.11 wireless standard, and (iii) a wireless line utilizing HDR, a mobile phone network, a satellite line, a ground wave digital network, and the like, as the transmission medium. Note that, the present invention can be realized by a computer data signal which is realized by electronic transmission of the program code and which is embedded in a carrier wave.

Further, each block of the digital color multi-functional printer 1 and/or the server 50 is not necessarily realized by software but may be realized by hardware logic. A combination of hardware for carrying out part of processing and operation means executing software for controlling the hardware and carrying out the rest of the processing may be used.

A computer system of the present invention may include: an image input device such as a flat bed scanner, a film scanner, and a digital camera; an image display device, such as a CRT display and a liquid crystal display, for displaying processing results of a computer in which a predetermined program code is loaded so as to carry out various processing such as the similarity calculation and the similarity determination; and an image forming apparatus, such as a printer, for outputting the processing results of the computer onto paper or the like. Further, the computer system may include a network card, a modem, and the like, each of which serves as communication means for allowing connection with a server or the like via a network.

As described above, in order to solve the problems, an image processing apparatus of the present invention comprises: an input data obtaining section for obtaining input image data; a features extracting section for extracting features of the input image data; at least one of a storage section for storing features of each of reference images and a reference image obtaining section for obtaining the features of the reference image from an external device communicably connected to the image processing apparatus; a similarity calculation section for comparing the features of the input image data with the features of the reference image so as to calculate a similarity between the input image data and the reference image; and a control section for determining whether it is necessary or not to forbid or restrict image processing with respect to the input image data in accordance with whether or not the similarity is not less than a predetermined threshold value, said image processing apparatus being characterized in that: the reference images include a permissible reference image which permits image processing and a restrictive reference image which forbids or restricts image processing, and the image processing apparatus further comprises a discrimination information obtaining section for obtaining, from the storage section or the external device, discrimination information for discriminating the permissible reference image and the restrictive reference image from each other, and when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image.

Note that, the image processing should not be narrowly interpreted as image transformation, conversion, encode, or the like, and means also various processing carried out with respect to image data, e.g., copying, printing, electronic distribution, facsimile transmission, filing, image data correction, edition, conversion, encode, and the like. Further, the input data obtaining section may be arranged so that, for example, a scanner scans a document so as to acquire input image data, or may be arranged so that input image data generated by inputting necessary information to an electronic data format by using software is obtained, or may be arranged so that input image data directly generated as electronic data is obtained, or may be arranged so that input image data sent from a device communicably connected to the image processing apparatus is obtained.

According to the arrangement, the features extracting section extracts features of the input image data obtained by the input data obtaining section. Further, the similarity calculation section compares the features of the input image data which features have been extracted by the features extracting section with features of a reference image which features are stored in the storage section or features of a reference image which features have been obtained from the external device by the reference image obtaining section so as to calculate a similarity between both the images. Note that, the reference images include a permissible reference image which permits image processing and a restrictive reference image which forbids or restricts image processing. Further, the discrimination information obtaining section obtains, from the storage section or the external device, discrimination information for discriminating the permissible reference image and the restrictive reference image from each other, and when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image.

Both the permissible reference image and the restrictive reference image are stored. Thus, in case where the maximum value of the similarity calculated by the similarity determination process section is not less than the threshold value, whether or not it is necessary to forbid or restrict image processing can be determined in accordance with whether a reference image having a maximum similarity is the permissible reference image or the restrictive reference image. Therefore, for example, even if input image data is erroneously determined as being identical to a restrictive reference image, the input image data can be stored as a permissible reference image, thereby preventing the image input data from being erroneously determined thereafter. Adversely, even if input image data is erroneously determined as being identical to a permissible reference image, the input image data can be stored as a restrictive reference image, thereby preventing the image input data from being erroneously determined thereafter.

An image processing apparatus of the present invention may be arranged so as to comprise: an input data obtaining section for obtaining input image data; a features extracting section for extracting features of the input image data; at least one of a storage section for storing features of a restrictive reference image which forbids or restricts image processing and a reference image obtaining section for obtaining the features of the restrictive reference image from an external device communicably connected to the image processing apparatus; a similarity calculation section for comparing the features of the input image data with the features of the restrictive reference image so as to calculate a similarity between the input image data and the restrictive reference image; and a control section for forbidding or restricting image processing with respect to the input image data in case where the similarity is not less than a predetermined threshold value, said image processing apparatus being characterized by further comprising a storage process section for storing, into the storage section or a second storage section provided on the external device, (i) features of a permissible reference image which permits image processing and (ii) discrimination information for discriminating the restrictive reference image and the permissible reference image from each other, wherein the similarity calculation section calculates the similarity between the input image data and the restrictive reference image and a similarity between the input image data and the permissible reference image, and the control section permits image processing with respect to the input image data in case where the similarity to the restrictive reference image is not less than the threshold value and the similarity to the permissible reference image is higher than the similarity to the restrictive reference image.

According to the arrangement, the features extracting section extracts features of the input image data obtained by the input data obtaining section. Further, the similarity calculation section compares the features of the input image data which features have been extracted by the features extracting section with features of a restrictive reference image which features are stored in the storage section or features of a restrictive reference image which features have been obtained from the external device by the reference image obtaining section so as to calculate a similarity between both the images. The control section forbids or restricts image processing with respect to the input image data in case where the similarity is not less than the threshold value. However, the image processing apparatus includes the storage process section for storing, into the storage section or the second storage section provided on the external device, (i) features of a permissible reference image which permits image processing and (ii) discrimination information for discriminating the restrictive reference image and the permissible reference image from each other, and the similarity calculation section calculates the similarity between the input image data and the restrictive reference image and a similarity between the input image data and the permissible reference image. Further, the control section permits image processing with respect to the input image data in case where the similarity to the restrictive reference image is not less than the threshold value and the similarity to the permissible reference image is higher than the similarity to the restrictive reference image.

Thus, even if input image data has a similarity to a restrictive reference image which similarity is not less than the threshold value though the input image data is actually not image data of the restrictive reference image, the input image data can be stored as a permissible reference image, thereby carrying out image processing with respect to the input image data. For example, even if input image data is erroneously determined as being identical to a restrictive reference image, the input image data can be stored as a permissible reference image, thereby preventing the image input data from being erroneously determined thereafter. As a result, it is possible to prevent image processing with respect to the input image data from being inappropriately forbidden or restricted.

Further, an image processing apparatus of the present invention may be arranged so as to comprise: an input data obtaining section for obtaining input image data; a features extracting section for extracting features of the input image data; at least one of a storage section for storing features of a permissible reference image which permits image processing and a reference image obtaining section for obtaining the features of the permissible reference image from an external device communicably connected to the image processing apparatus; a similarity calculation section for comparing the features of the input image data with the features of the permissible reference image so as to calculate a similarity between the input image data and the permissible reference image; and a control section for permitting image processing with respect to the input image data in case where the similarity is not less than a predetermined threshold value, said image processing apparatus being characterized by further comprising a storage process section for storing, into the storage section or a second storage section provided on the external device, (i) features of a restrictive reference image which forbids or restricts image processing and (ii) discrimination information for discriminating the permissible reference image and the restrictive reference image from each other, wherein the similarity calculation section calculates the similarity between the input image data and the permissible reference image and a similarity between the input image data and the restrictive reference image, and the control section forbids or restricts image processing with respect to the input image data in case where the similarity to the permissible reference image is not less than the threshold value and the similarity to the restrictive reference image is higher than the similarity to the permissible reference image.

According to the arrangement, the features extracting section extracts features of the input image data obtained by the input data obtaining section. Further, the similarity calculation section compares the features of the input image data which features have been extracted by the features extracting section with features of a permissible reference image which features are stored in the storage section or features of a permissible reference image which features have been obtained from the external device by the reference image obtaining section so as to calculate a similarity between both the images. The control section forbids or restricts image processing with respect to the input image data in case where the similarity is not less than the threshold value. However, the image processing apparatus includes the storage process section for storing, into the storage section or the second storage section provided on the external device, (i) features of a restrictive reference image which permits image processing and (ii) discrimination information for discriminating the restrictive reference image and the permissible reference image from each other, and the similarity calculation section calculates the similarity between the input image data and the permissible reference image and a similarity between the input image data and the restrictive reference image. Further, the control section forbids or restricts image processing with respect to the input image data in case where the similarity to the permissible reference image is not less than the threshold value and the similarity to the restrictive reference image is higher than the similarity to the permissible reference image.

Thus, even if input image data has a similarity to a permissible reference image which similarity is not less than the threshold value though the input image data is actually not image data of the permissible reference image, the input image data can be stored as a restrictive reference image, thereby forbidding or restricting image processing with respect to the input image data. For example, even if input image data is erroneously determined as being identical to a permissible reference image, the input image data can be stored as a restrictive reference image, thereby preventing the image input data from being erroneously determined thereafter. As a result, it is possible to prevent image processing with respect to the input image data from being inappropriately permitted. This improves the security for the exceptional reference image. For example, it is possible to surely prevent image processing, such as copying, printing, transmission, conversion/edition, from being inappropriately carried out with respect to the exceptional reference image.

Further, the image processing apparatus may be arranged so that the control section forbids or restricts image processing with respect to the input image data in case where a reference image having a maximum similarity calculated by the similarity calculation section is the permissible reference image and the similarity to the restrictive reference image is not less than a second threshold value higher than the threshold value or in case where the similarity to the restrictive reference image is not less than the second threshold value and a difference between the maximum value and the similarity to the restrictive reference image is not more than a predetermined value.

According to the arrangement, even in case where a reference image having a maximum similarity is the permissible reference image, when a similarity to the restrictive reference image is not less than the second threshold value higher than the threshold value or when a difference between the similarity to the permissible reference image and the similarity to the restrictive reference image is not more than a predetermined value, image processing with respect to the input image data is forbidden or restricted. This improves the security for the restrictive reference image.

Further, the image processing apparatus may be arranged so as to further comprise a temporary reference information storage section for storing information concerning a reference target image which is requested to be stored as a reference image, wherein the control section, in storing the reference target image as the reference image, carries out: a process in which a temporary reference identifier ID is assigned to the reference target image and the temporary reference identifier ID and features extracted from the reference target image are stored in the temporary reference information storage section; a process in which a read image by causing image reading section to read again a document corresponding to the reference target image is obtained and a similarity between the read image and the reference target image stored in the temporary reference information storage section and a similarity between the read image and the reference image having been already stored in the storage section or the second storage section is calculated in accordance with features extracted from the read image so as to determine whether or not there are plural images having similarities each of which is said similarity and is not less than a predetermined threshold value; a process in which the storage process section formally stores the reference target image into the storage section or the second storage section as a reference image in case where it is determined that there are not the plural images; and a process in which a difference between the similarities of the plural images is calculated in case where it is determined that there are the plural images, and the storage process section formally stores the reference target image into the storage section or the second storage section as a reference image in case where the difference is not less than a predetermined threshold value, and formal storage of the reference target image into the storage section or the second storage section is forbidden in case where the difference is less than the predetermined threshold value.

According to the arrangement, in case where storage of the reference target image is requested, it is determined whether the reference target image and the reference image having been stored can be discriminated from each other or not, and in case where the images can be discriminated from each other, the storage is carried out, and in case where the images cannot be discriminated from each other, the storage of the reference target image can be forbidden. Thus, it is possible to prevent storage of an image which cannot be discriminated from the reference image having been stored, so that whether the input image is similar to the restrictive reference image or the permissible reference image can be determined with high accuracy.

Further, the image processing apparatus may be arranged so as to comprise a stored data clearing section for deleting the information concerning the reference target image stored in the temporary reference information storage section in case where the difference is less than the predetermined threshold value.

According to the arrangement, it is possible to delete the information concerning the reference target image which cannot be discriminated, so that it is possible to prevent leakage of the information concerning the reference target image.

An image forming apparatus of the present invention comprises the image processing apparatus based on any one of the aforementioned arrangements and an image output section for forming an image corresponding to the input image data onto a printing medium.

According to the image forming apparatus, both the restrictive reference image and the permissible reference image are stored, so that it is possible to determine whether it is necessary or not to forbid or restrict image processing in accordance with whether a reference image having a maximum similarity is the restrictive reference image or the permissible reference image in case where the maximum similarity calculated by the similarity determination process section is not less than the threshold value.

In order to solve the foregoing problems, an image processing method of the present invention comprises the steps of: (i) obtaining input image data; (ii) extracting features of the input image data; (iii) obtaining features of each of reference images; (iv) calculating a similarity between the input image data and the reference image by comparing the features of the input image data with the features of the reference image; and (v) determining whether it is necessary or not to forbid or restrict image processing with respect to the input image data in accordance with whether or not the similarity is not less than a predetermined threshold value, said image processing method being characterized in that: the reference images includes a permissible reference image which permits image processing and a restrictive reference image which forbids or restricts image processing, and the image processing method further comprises the step (vi) of obtaining discrimination information for discriminating the permissible reference image and the restrictive reference image from each other, in the step (v), when a maximum value of the similarity calculated in the step (vi) is not less than the threshold value, image processing with respect to the input image data being permitted in case where a reference image having a maximum similarity is the permissible reference image, and image processing with respect to the input image data being forbidden or restricted in case where the reference image having the maximum similarity is the restrictive reference image.

According to the method, features of the input image data obtained in the step (i) is extracted in the step (ii). Further, a similarity between the input image data and the reference image is calculated in the step (iv) by comparing the features of the input image data which features have been extracted in the step (ii) with features of the reference image which features have been obtained in the step (iii). Note that, the reference images include a permissible reference image which permits image processing and a restrictive reference image which forbids or restricts image processing. Further, in the step (vi), discrimination information for discriminating the permissible reference image and the restrictive reference image from each other is obtained, and in the step (v), when a maximum value of the similarity calculated in the step (iv) is not less than the threshold value, image processing with respect to the input image data is permitted in case where a reference image having a maximum similarity is the permissible reference image, and image processing with respect to the input image data is forbidden or restricted in case where the reference image having the maximum similarity is the restrictive reference image.

Thus, in case where the maximum value of the similarity calculated in the step (iv) is not less than the threshold value, whether or not it is necessary to forbid or restrict image processing can be determined in accordance with whether a reference image having a maximum similarity is the permissible reference image or the restrictive reference image. Therefore, for example, even if input image data is erroneously determined as being identical to a restrictive reference image, the input image data can be stored as a permissible reference image, thereby preventing the image input data from being erroneously determined thereafter. Adversely, even if input image data is erroneously determined as being identical to a permissible reference image, the input image data can be stored as a restrictive reference image, thereby preventing the image input data from being erroneously determined thereafter.

In order to solve the foregoing problems, an image processing system of the present invention comprises an image processing apparatus and a server communicably connected to the image processing apparatus, there being provided: an input data obtaining section for obtaining input image data; a storage section for storing features of each of reference images; a similarity calculation section for comparing features of the input image data with the features of the reference image so as to calculate a similarity between the input image data and the reference image; and a control section for determining whether it is necessary or not to forbid or restrict image processing with respect to the input image data in accordance with whether or not the similarity is not less than a predetermined threshold value, the input data obtaining section, the storage section, the similarity calculation section, and the control section being divided into the image processing apparatus and the server, the reference images including a permissible reference image which permits image processing and a restrictive reference image which forbids or restricts image processing, the image processing system further comprising a discrimination information obtaining section for obtaining, from the storage section, discrimination information for discriminating the permissible reference image and the restrictive reference image from each other, wherein, when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image.

According to the arrangement, the features extracting section extracts features of the input image data obtained by the input data obtaining section. Further, the similarity calculation section compares the features of the input image data which features have been extracted by the features extracting section with features of a reference image which features are stored in the storage section so as to calculate a similarity between both the images. Note that, the reference images include a permissible reference image which permits image processing and a restrictive reference image which forbids or restricts image processing. Further, the discrimination information obtaining section obtains, from the storage section or the external device, discrimination information for discriminating the permissible reference image and the restrictive reference image from each other, and when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image.

Both the permissible reference image and the restrictive reference image are stored. Thus, in case where the maximum value of the similarity calculated by the similarity determination process section is not less than the threshold value, whether or not it is necessary to forbid or restrict image processing can be determined in accordance with whether a reference image having a maximum similarity is the permissible reference image or the restrictive reference image. Therefore, for example, even if input image data is erroneously determined as being identical to a restrictive reference image, the input image data can be stored as a permissible reference image, thereby preventing the image input data from being erroneously determined thereafter. Adversely, even if input image data is erroneously determined as being identical to a permissible reference image, the input image data can be stored as a restrictive reference image, thereby preventing the image input data from being erroneously determined thereafter.

Note that, the image processing apparatus may be realized by a computer. In this case, the scope of the present invention includes also: an image processing program which causes a computer to operate as the respective sections so that the image processing apparatus is realized by the computer; and a computer-readable storage medium in which the image processing program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus, comprising: an input data obtaining section for obtaining input image data; a features extracting section for extracting features of the input image data; at least one of a storage section for storing features of each of reference images and a reference image obtaining section for obtaining the features of the reference image from an external device communicably connected to the image processing apparatus; a similarity calculation section for comparing the features of the input image data with the features of the reference image so as to calculate a similarity between the input image data and the reference image; and a control section for determining whether it is necessary or not to forbid or restrict image processing with respect to the input image data in accordance with whether or not the similarity is not less than a predetermined threshold value, the reference images including a permissible reference image which permits image processing and a restrictive reference image which forbids or restricts image processing, the image processing apparatus further comprising a discrimination information obtaining section for obtaining, from the storage section or the external device, discrimination information for discriminating the permissible reference image and the restrictive reference image from each other, wherein when a maximum value of the similarity calculated by the similarity calculation section is less than the threshold value, the control section permits image processing with respect to the input image data, when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image, and the control section forbids or restricts image processing with respect to the input image data in case where a reference image having a maximum similarity calculated by the similarity calculation section is the permissible reference image and the similarity to the restrictive reference image is not less than a second threshold value higher than the threshold value or in case where the similarity to the restrictive reference image is not less than the second threshold value and a difference between the maximum value and the similarity to the restrictive reference image is not more than a predetermined value.

2. An image processing apparatus, comprising: an input data obtaining section for obtaining input image data; a features extracting section for extracting features of the input image data; at least one of a storage section for storing features of a restrictive reference image which forbids or restricts image processing and a reference image obtaining section for obtaining the features of the restrictive reference image from an external device communicably connected to the image processing apparatus; a similarity calculation section for comparing the features of the input image data with the features of the restrictive reference image so as to calculate a similarity between the input image data and the restrictive reference image; and a control section for determining whether it is necessary or not to forbid or restrict image processing with respect to the input image data, the image processing apparatus further comprising a storage process section for storing, into the storage section or a second storage section provided on the external device, (i) features of a permissible reference image which permits image processing and (ii) discrimination information for discriminating the restrictive reference image and the permissible reference image from each other, the similarity calculation section calculating the similarity between the input image data and the restrictive reference image and a similarity between the input image data and the permissible reference image, when a maximum value of the similarity calculated by the similarity calculation section is less than the threshold value, the control section permitting image processing with respect to the input data, when a maximum value of the similarity calculated by the similarity calculation section is not less than the threshold value, the control section permitting image processing with respect to the input image data in case where a reference image having a maximum similarity is the permissible reference image, and the control section forbidding or restricting image processing with respect to the input image data in case where the reference image having the maximum similarity is the restrictive reference image, and the control section forbidding or restricting image processing with respect to the input image data in case where a reference image having a maximum similarity calculated by the similarity calculation section is the permissible reference image and the similarity to the restrictive reference image is not less than a second threshold value higher than the threshold value or in case where the similarity to the restrictive reference image is not less than the second threshold value and a difference between the maximum value and the similarity to the restrictive reference image is not more than a predetermined value.

3. An image processing apparatus, comprising: an input data obtaining section for obtaining input image data; a features extracting section for extracting features of the input image data; at least one of a storage section for storing features of a permissible reference image which permits image processing and a reference image obtaining section for obtaining the features of the permissible reference image from an external device communicably connected to the image processing apparatus; a similarity calculation section for comparing the features of the input image data with the features of the permissible reference image so as to calculate a similarity between the input image data and the permissible reference image; and a control section for determining whether it is necessary or not to forbid or restrict image processing with respect to the input image data, the image processing apparatus further comprising a storage process section for storing, into the storage section or a second storage section provided on the external device, (i) features of a restrictive reference image which forbids or restricts image processing and (ii) discrimination information for discriminating the permissible reference image and the restrictive reference image from each other, the similarity calculation section calculating the similarity between the input image data and the permissible reference image and a similarity between the input image data and the restrictive reference image, when a maximum value of the similarity calculated by the similarity calculation section is less than the threshold value, the control section permitting image processing with respect to the input data, when a maximum value of the similarity calculated by the similarity calculation section is not less than the threshold value, the control section permitting image processing with respect to the input image data in case where a reference image having a maximum similarity is the permissible reference image, and the control section forbidding or restricting image processing with respect to the input image data in case where the reference image having the maximum similarity is the restrictive reference image, and the control section forbidding Or restricting image processing with respect to the input image data in case where a reference image having a maximum similarity calculated by the similarity calculation section is the permissible reference image and the similarity to the restrictive reference image is not less than a second threshold value higher than the threshold value or in case where the similarity to the restrictive reference image is not less than the second threshold value and a difference between the maximum value and the similarity to the restrictive reference image is not more than a predetermine value.

4. The image processing apparatus as set forth in claim 1, further comprising a temporary reference information storage section for storing information concerning a reference target image which is requested to be stored as a reference image,
the control section, in storing the reference target image as the reference image, carrying out:
a process in which a temporary reference identifier ID is assigned to the reference target image and the temporary reference identifier ID and features extracted from the reference target image are stored in the temporary reference information storage section;
a process in which a read image by causing image reading section to read again a document corresponding to the reference target image is obtained and a similarity between the read image and the reference target image stored in the temporary reference information storage section and a similarity between the read image and the reference image having been already stored in the storage section or the second storage section is calculated in accordance with features extracted from the read image so as to determine whether or not there are plural images having similarities each of which is said similarity and is not less than a predetermined threshold value;
a process in which the storage process section formally stores the reference target image into the storage section or the second storage section as a reference image in case where it is determined that there are not the plural images; and
a process in which a difference between the similarities of the plural images is calculated in case where it is determined that there are the plural images, and the storage process section formally stores the reference target image into the storage section or the second storage section as a reference image in case where the difference is not less than a predetermined threshold value, and formal storage of the reference target image into the storage section or the second storage section is forbidden in case where the difference is less than the predetermined threshold value.

5. The image processing apparatus as set forth in claim 4, further comprising a stored data clearing section for clearing the information concerning the reference target image stored in the temporary reference information storage section in case where the difference is less than the predetermined threshold value.

6. An image forming apparatus, comprising the image processing apparatus as set forth in claim 1 and an image output section for forming an image corresponding to the input image data onto a printing medium.

7. An image processing method, comprising the steps of: (i) obtaining input image data; (ii) extracting features of the input image data; (iii) obtaining features of each of reference images; (iv) calculating a similarity between the input image data and the reference image by comparing the features of the input image data with the features of the reference image; and (v) determining whether it is necessary or not to forbid or restrict image processing with respect to the input image data in accordance with whether or not the similarity is not less than a predetermined threshold value,
the reference images including a permissible reference image which permits image processing and a restrictive reference image which forbids or restricts image processing,
the image processing method further comprising the step (vi) of obtaining discrimination information for discriminating the permissible reference image and the restrictive reference image from each other,
in the step (v), when a maximum value of the similarity calculated in the step (vi) is not less than the threshold value,
image processing with respect to the input image data being permitted in case where a reference image having a maximum similarity is the permissible reference image, and
image processing with respect to the input image data being forbidden or restricted in case where the reference image having the maximum similarity is the restrictive reference image,
and image processing with respect to the input image data being forbidden or restricted in case where a reference image having a maximum similarity is the permissible reference image and the similarity to the restrictive reference image is not less than a second threshold value higher than the threshold value or in a case where the similarity to the restrictive reference image is not less than the second threshold value and a difference between the maximum value and the similarity to the restrictive reference image is not more than a predetermined value.

8. An image processing system, comprising an image processing apparatus and a server communicably connected to the image processing apparatus, there being provided:
an input data obtaining section for obtaining input image data;
a storage section for storing features of each of reference images;
a similarity calculation section for comparing features of the input image data with the features of the reference image so as to calculate a similarity between the input image data and the reference image; and
a control section for determining whether it is necessary or not to forbid or restrict image processing with respect to the input image data in accordance with whether or not the similarity is not less than a predetermined threshold value,
the input data obtaining section, the storage section, the similarity calculation section, and the control section being divided into the image processing apparatus and the server,
the reference images including a permissible reference image which permits image processing and a restrictive reference image which forbids or restricts image processing,
the image processing system further comprising a discrimination information obtaining section for obtaining, from the storage section, discrimination information for discriminating the permissible reference image and the restrictive reference image from each other,
wherein,
when a maximum value of the similarity calculated by the similarity calculation section is less than the threshold value, the control section permits image processing with respect to the input image data, when a maximum value of the similarity calculated by the similarity calculation section is not less than the threshold value, the control section permits image processing with respect to the input image data in case where a reference image having a maximum similarity is the permissible reference image, and the control section forbids or restricts image processing with respect to the input image data in case where the reference image having the maximum similarity is the restrictive reference image, and the control section forbids or restricts image processing with respect to the input image data in case where a reference image having maximum similarity calculated by the similarity calculation section is the permissible reference image and the similarity to the restrictive reference image is not less than a second threshold value higher than the threshold value or in case where the similarity to the restrictive reference image is not less than the second threshold value and a difference between the maximum value and the similarity to the restrictive reference image is not more than a predetermined value.

9. A computer-readable storage medium, storing a program which causes the image processing apparatus as set forth in claim 1 to operate and causes a computer to function as the respective sections of the image processing apparatus.

* * * * *